US010895738B1

(12) United States Patent
Sears et al.

(10) Patent No.: US 10,895,738 B1
(45) Date of Patent: Jan. 19, 2021

(54) SYSTEMS AND METHODS UTILIZING ROTATABLE OPTICS FOR PROJECTING LIGHT TO A VIEWER

(71) Applicant: Facebook Technologies, LLC, Menlo Park, CA (US)

(72) Inventors: Jasmine Soria Sears, Redmond, WA (US); Stephen James McNally, Sammamish, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 253 days.

(21) Appl. No.: 16/190,758

(22) Filed: Nov. 14, 2018

Related U.S. Application Data

(60) Provisional application No. 62/688,958, filed on Jun. 22, 2018.

(51) Int. Cl.
*G02B 26/08* (2006.01)

(52) U.S. Cl.
CPC ................. *G02B 26/0891* (2013.01)

(58) Field of Classification Search
CPC ................................................ G02B 26/0891
USPC .......................................... 359/211.1–211.8
See application file for complete search history.

(56) References Cited

U.S. PATENT DOCUMENTS

| 10,757,398 | B1 * | 8/2020 | Magoz | H04N 13/167 |
| 2003/0030597 | A1 * | 2/2003 | Geist | G02B 27/0172 345/8 |
| 2010/0007934 | A1 * | 1/2010 | Tokui | G02B 26/108 359/205.1 |
| 2013/0182322 | A1 * | 7/2013 | Silverstein | G02B 30/23 359/464 |
| 2015/0169925 | A1 * | 6/2015 | Chen | G06K 7/1443 235/375 |

OTHER PUBLICATIONS

Sears, Jasmine Soria, "Systems and Methods for Transferring an Image to an Array of Emissive Subpixels", U.S. Appl. No. 16/292,366, filed Mar. 5, 2019, 105 pages.
Magoz et al., "Systems & Methods for Generating Temporally Multiplexed Images", U.S. Appl. No. 16/190,776, filed Nov. 14, 2018, 88 pages.
Sears, Jasmine Soria, "Apparatus, Systems, and Methods to Compensate for Sub-Standard Subpixels in an Array", U.S. Appl. No. 16/357,853, filed Mar. 19, 2019, 102 pages.

\* cited by examiner

*Primary Examiner* — Jennifer D. Carruth
(74) *Attorney, Agent, or Firm* — FisherBroyles, LLP

(57) ABSTRACT

A display device for projecting light to a viewer may include (1) a plurality of subpixels, in which subpixels may emit light of differing spectral distributions, (2) at least one light deviator disposed optically downstream from the plurality of subpixels, and (3) and a controller. The light emitted from each of the plurality of subpixels may be transmitted through and laterally shifted by the least one light deviator towards a viewer and the at least one light deviator may be mechanically rotatable by a force applied to an outer circumferential region of the at least one light deviator. The controller may control illumination of at least a subset of the plurality of subpixels in synchronization with rotation of the at least one light deviator. Various other apparatus, systems, and methods are also disclosed.

20 Claims, 20 Drawing Sheets

SYSTEMS AND METHODS UTILIZING ROTATABLE OPTICS FOR PROJECTING LIGHT TO A VIEWER

CROSS REFERENCE TO RELATED APPLICATION

This application is a non-provisional utility application which claims the benefit of U.S. Provisional Application No. 62/688,958 filed 22 Jun. 2018, the disclosure of which is incorporated, in its entirety, by this reference.

BACKGROUND

Emissive arrays in display devices produce images made up of many pixels. Such arrays commonly control the color and brightness of each pixel to present an image. A pixel is in turn often composed of multiple subpixels that emit light of differing spectral distributions. Due to its small size, a human eye typically does not perceive a subpixel individually. Instead the eye blends the light emitted from the subpixels producing the impression of a single source of light, the pixel. The color and brightness of a pixel may be controlled by varying the brightness of the underlying subpixels. For example, the underlying subpixels may produce a white pixel by illuminating with substantially equal intensity. The underlying subpixels may produce different pixel colors by changing their relative brightness. The size of the single uniform pixel, which determines the resolution of an array, is typically equal to the sum of the sizes of its constituent subpixels and or the smallest feature that an array can resolve.

Subpixel array manufacturers commonly configure subpixels to emit light with the colors of red, blue, or green. These three colors may be combined to span a range of perceivable colors while minimizing the size of a pixel. However, such pixels are often unable to reproduce colors with a wavelength greater than that of the red subpixel or a wavelength less than that of the blue subpixel. An array may produce colors outside of these color ranges using additional subpixels, at the cost of increasing the individual pixel size and loss of resolution, unless the subpixel sizes were to shrink beyond what is currently available. Additionally, conventional displays often have out-of-spec pixels that may be noticeable to users, negatively impacting their viewing experience.

SUMMARY

As will be described in greater detail below, the instant disclosure describes devices, systems, and methods for projecting light to a viewer such that light from one location in a subpixel array appears to a viewer to originate from another location in that array.

In one example, a display device for projecting light to a viewer may include (1) a plurality of subpixels, each of the plurality of subpixels operable to emit light, (2) at least one light deviator or lateral-light-shifting optic (LLSO) disposed optically downstream from the plurality of subpixels, and (3) a controller. The light emitted from each of the plurality of subpixels may be transmitted through and laterally shifted by the least one light deviator towards a viewer and the at least one light deviator may be mechanically rotatable by a force applied to an outer circumferential region of the at least one light deviator. The controller that may control illumination at least a subset of the plurality of subpixels in synchronization with rotation of the at least one light deviator.

In some embodiments, the display device may include an optical system configured to focus the light from the at least one light deviator to the viewer. In at least one example, each of the at least one light deviator may be disposed on a rotatable holder that is mechanically engaged with a drive mechanism. The rotatable holder and each of the at least one light deviator may be either configured separately or configured as an integral unit. According to some embodiments, the light deviator may have at least one of a prismatic, a planar, a lenticular, or an anamorphic profile. In this example, the lenticular profile may provide optical power to the at least one light deviator. In various examples, the at least one light deviator may include a plurality of light deviators so disposed as to be mechanically engaged with each other and at least one of the plurality of light deviators may be mechanically engaged with a drive mechanism by at least one of a belt or a gear.

In certain embodiments, a portion of the at least one light deviator having a cylindrical outer surface may be rotationally supported in a support member having a cylindrical inner surface that abuts the cylindrical outer surface. In some examples, the controller may be configured to shift the plurality of subpixels in a lateral dimension in synchronization with the rotation of the at least one light deviator and the illumination of the subset of the plurality of subpixels.

In some embodiments, a method for projecting light to a viewer may include (1) illuminating each of a plurality of subpixels of a display device, wherein light from each illuminated subpixel of the plurality of subpixels is laterally shifted by at least one light deviator disposed optically downstream of the plurality of subpixels, (2) mechanically rotating the at least one light deviator by application of a force to an outer circumferential region of the at least one light deviator, and (3) synchronizing the rotation of the at least one light deviator with the illumination of at least one subpixel of the plurality of subpixels by a controller.

In some embodiments, the method may include focusing the laterally shifted light by an optical system to be viewed by a viewer. In at least one example, each of the at least one light deviator may be disposed on a rotatable holder that is mechanically engaged with a drive mechanism, wherein the rotatable holder and each of the at least one light deviator is either configured separately or configured as an integral unit. In some examples, at least one of the rotatable holder or the at least one light deviator may be configured to at least one of tilt or pivot. In this example, the at least one light deviator may have at least one of a prismatic, an anamorphic, a lenticular, or a planar profile, wherein the lenticular profile provides optical power to the at least one light deviator. According to various examples, the at least one light deviator may include a plurality of light deviators so disposed as to be mechanically engaged with each other and at least one of the plurality of light deviators may be mechanically engaged with a drive mechanism by at least one of a belt or a gear. According to at least one example, a portion of the at least one light deviator having a cylindrical outer surface may be rotationally supported in a support member having a cylindrical inner surface that abuts the cylindrical outer surface.

In some embodiments, a display device for projecting light to a viewer may include (1) a plurality of subpixels, each of the plurality of subpixels operable to emit light, (2) at least one light deviator disposed optically downstream from the plurality of subpixels, and (3) a controller. The light emitted from each of the plurality of subpixels may be transmitted through and laterally shifted by the least one light deviator towards a viewer and the at least one light deviator may have two surfaces, at least one of the two surfaces being optically coated to at least one of reduce ghost reflections, polarize the light emitted from each of the plurality of subpixels, or to analyze the light emitted from each of the plurality of subpixels. In this example, the controller may control illumination of at least a subset of the plurality of subpixels in synchronization with rotation of the at least one light deviator.

According to certain embodiments, the at least one light deviator may be mechanically engaged to at least one drive mechanism that provides at least one of rotational, tiltable, or pivotal motion. In this example, rotational engagement between the at least one light deviator and the at least one drive mechanism may be with at least one of a belt or a gear at a circumferential region of the at least one light deviator. In some examples, a plurality of light deviators of the at least one light deviator may be mutually mechanically engaged with each other and a single light deviator of the plurality of light deviators may be mechanically engaged with a drive mechanism. In at least one example, a spindle may be centrally disposed in each of the at least one light deviator and the spindle may be mechanically engaged with a drive mechanism.

Features from any of the above-mentioned embodiments may be used in combination with one another in accordance with the general principles described herein. These and other embodiments, features, and advantages may be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
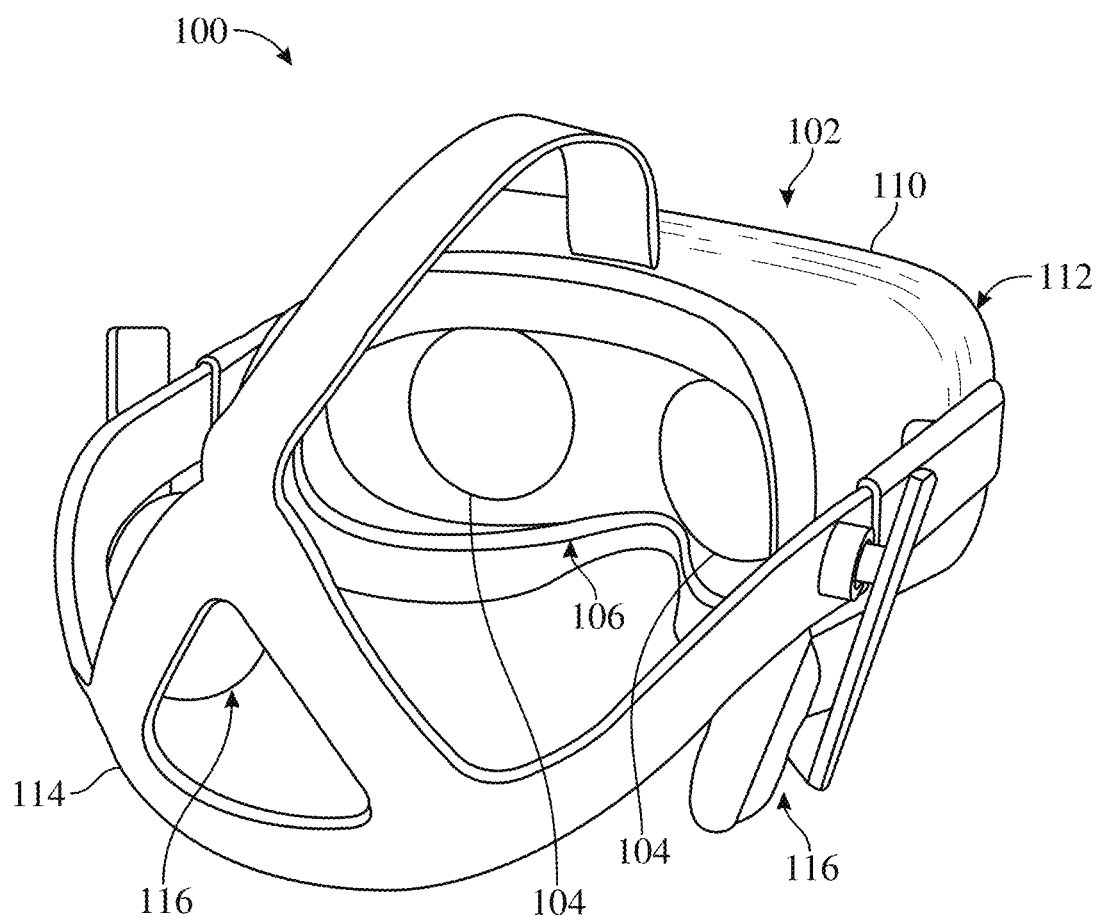
FIG. 1 is a perspective view of a head-mounted display (HMD), in accordance with one or more embodiments disclosed herein.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and may be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to apparatus, systems, and methods for projecting light from an array of subpixels to a viewer. As will be explained in greater detail below, embodiments of the instant disclosure may include one or more arrays of subpixels utilized in a combination with a computing device. The subpixel arrays may be used in, for example, a head-mounted display (HMD), an external monitor, a built-in monitor, or other suitable display including an array of colored subpixels where individual pixels and/or subpixels can be separately operable to emit light. The array of subpixels may include a subpixel layout that includes at least a plurality of subpixel types of three or more different colors arranged in selected linear paths, circular or substantially circular paths, and/or any other suitable paths (e.g., rectangular paths, square paths, hexagonal paths, etc.). In some embodiments, an array of subpixels may include a light-emitting layer and a color selector layer (e.g., a color filter layer, a color converting emissive layer, etc.) that may be moved parallel relative to the light-emitting layer by an actuator.

The described display arrays and subpixel arrangements may allow for spatial and/or temporal pixel or subpixel averaging. Each pixel may include subpixels that are operable to emit a white light when illuminated concurrently. Each color of a subpixel may lie on a circular path such that a circular translation may allow each color subpixel to appear in the same location. In some examples, a pixel or subpixel at one physical location on the array may seem to a viewer to originate from a different array location, while the array remains stationary.

Figure 2:
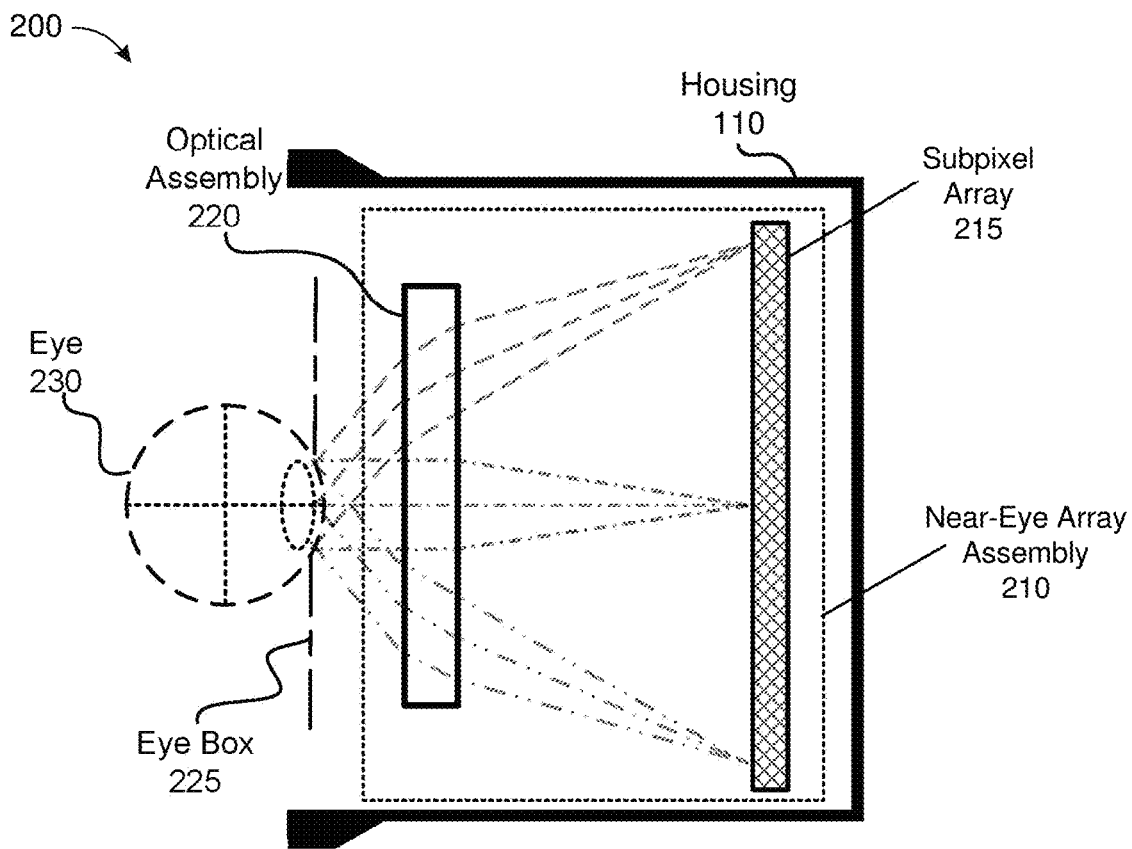
FIG. 2 is a cross-sectional side view of a portion of a front section of an HMD in accordance with some embodiments.
Figure 3:
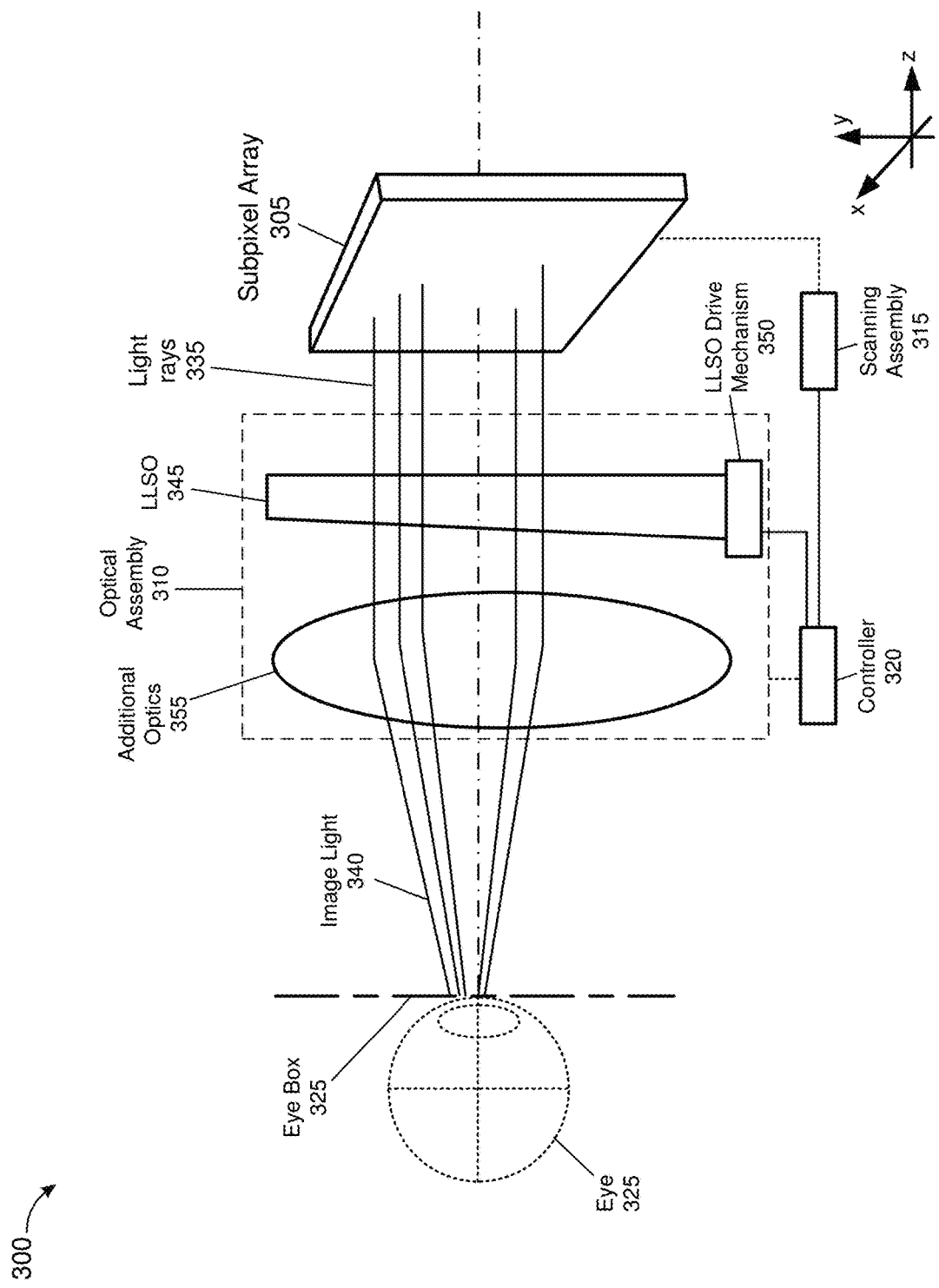
FIG. 3 is a diagram depicting a portion of an exemplary near-eye array assembly which may be a component in the HMD of FIG. 1 in accordance with some embodiments.

The following will provide, with reference to FIG. 1-3, detailed descriptions of exemplary head-mounted display systems. In addition, the discussion associated with FIGS. 4-18 and 20 will provide examples of light deviators and/or lateral-light-shifting optics (LLSOs) and light deviator systems used in display devices and systems. Further, detailed descriptions of methods for projecting light to a viewer will be provided in connection with FIG. 19.

Embodiments of the present disclosure may include or be implemented in conjunction with an artificial reality system. Artificial reality is a form of perceived reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in artificial reality and/or are otherwise used (e.g., perform activities) in artificial reality.

An artificial reality system that provides the artificial reality content may be implemented on various platforms, including a head-mounted display (HMD) connected to a host computer system, a standalone HMD such as the one depicted in FIG. 1, a mobile device, or computing system, or any other hardware platform capable of providing artificial reality content to one or more viewers. Emerging applications require higher resolution of subpixel arrays, faster frame-rates, smaller total size, lighter weight, lower-power, higher color gamut, etc.

Embodiments of the present disclosure relate to apparatus and methods for manipulating the direction of light emitted from subpixels in an array of subpixels to virtual or apparent locations of other subpixels in that array by laterally shifting the emitted light. Such lateral shifting can aid in increasing the brightness of the apparent subpixel. Additionally or alternatively, the color of an apparent subpixel may be altered by combining laterally shifted light from other subpixels operable to emit light of varying colors and/or intensities. In at least one embodiment, laterally shifted light from other pixels may be utilized to address out-of-spec subpixels (e.g., dim, dead, or hot subpixels). For example, a dim or dead subpixel's apparent brightness may be increased by shifting light from a plurality of other subpixels. In some examples, a hot subpixel's apparent brightness may be lowered by shifting light from the hot subpixel to a plurality of other subpixel positions over the course of a frame. Such lateral shifting of light also permits, in some embodiments, the ability to create an image that possesses a depth of focus. This may allow the creation of more realistic images containing objects with varying degrees of sharpness, i.e., in or out of focus, and thus controls the perception of depth. The apparatus and methods presented herein may facilitate shifting a relative position of an array of subpixels to an optical assembly coupled to the array of subpixels during scanning of the subpixel array to obtain an image presented to an eye box having a resolution greater than an original resolution of the array.

FIG. 1 is a perspective view of an HMD 100, in accordance with one or more embodiments disclosed herein. The HMD 100 may be part of an artificial reality system. In embodiments that describe an AR system and/or a MR system, portions of an HMD device 102 of the HMD 100 may be at least partially transparent in the visible band (380 nm to 750 nm), and portions of the HMD 100 that are between the HMD device 102 of the HMD 100 and an eye of the user may be at least partially transparent (e.g., a partially transparent array).

In some embodiments, HMD 100 may include a HMD device 102, a strap subsystem 114, and audio subsystems 116. HMD device 102 may include any type or form of array device or system that is worn on or about a user's head and projects visual content to the user. HMD device 102 may project content in any suitable manner, including via a screen (e.g., a liquid crystal array (LCD) or a light-emitting diode (LED) screen), a projector, a cathode ray tube, an optical mixer, etc. HMD device 102 may project content in one or more of various media formats. For example, HMD device 102 may project videos, photos, and/or computer-generated imagery (CGI). HMD device 102 may include a housing 110 surrounding components of HMD device 102, including lenses 104 and various structural, mechanical, and electronic components, including array components as described herein. Housing 110 may define an opening surrounding a viewing region 106 configured to surround a portion of a user's face and field-of-view. Additionally, housing 110 may include a front-facing portion 112 disposed away from viewing region 106 and side surfaces extending from front-facing portion 112 and surrounding the internal components of head-mounted-array device 102.

FIG. 2 is a cross section 200 of the housing 110 of the HMD 100 shown in FIG. 1, in accordance with one or more embodiments. A near-eye subpixel array or array assembly presented in this disclosure, such as the example presented in FIG. 2, may include a subpixel array 215 and an optical assembly 220, the latter of which includes a scanning assembly. The subpixel array 215 may be configured with an array of subpixels operable to emit light. The optical assembly 220 may be configured to provide optical correction to the light, in the form of a lateral shift in the direction of the light, and then direct the light toward an eye box 225 of a user's eye 230. An eye box 225 can be defined as a region where an entrance pupil of a human eye can be located to perceive an acceptable quality image produced by the downstream viewing optics. The subpixel array 215 and/or optical assembly 220 may be moved rapidly, e.g., by the scanning assembly, to increase resolution and/or brightness of the light output by the near-eye array assembly and/or to correct for out-of-spec subpixels.

In some embodiments, the array 215 may have a relatively sparse population of pixels/subpixels and can be referred to as a sparsely populated array. Note that a subpixel may be considered herein as an emissive element, which operably emits light of a particular spectral distribution. A pixel in an array may be composed of multiple subpixels (e.g., often three to four subpixels, though this exemplary range is only commonplace, and fewer or greater numbers of subpixels per pixel are also possible), wherein each subpixel in the pixel operably emits light of a different spectral distribution. In other embodiments, the array 215 may have a relatively dense population of pixels/subpixels (e.g., in comparison to a sparsely populated display) and can be referred to as a densely-populated array. An example of a sparse array is that of a smart pixel array.

A subpixel array 215, and/or one or more components of the optical assembly 220 optically coupled to the subpixel array 215, may be rotated, pivoted, and/or tilted in a manner such that light from a given subpixel overlays light from another subpixel, thereby causing each subpixel location to function as a subpixel of the same size enhancing a perceived array resolution at the eye box. Stated equivalently, the light from one pixel or subpixel may be optically manipulated to appear to a viewer as if the light originated at a different location. The light emitted from a given subpixel may possess a unique set of virtual locations to which that light may be translated. This set of these virtual locations may be dependent on the space of positions that the light deviator or LLSO may achieve, which is related to its optical and mechanical designs. The number of virtual locations in a set possessed by a given subpixel may also depend upon the location of that subpixel in the array. A subpixel located in the center of the subpixel array may possess the maximum number of virtual locations, while, a subpixel located in a corner of a subpixel array may possess the smallest set of virtual locations. Thus, light from a given subpixel may be translocated to any of the virtual locations in its set and a particular element of that set may be selected by the position of the LLSO. A mapping may therefore exist between a single subpixel and one of its virtual locations by the positional configuration of the LLSO.

In some embodiments, the near-eye array assembly may be incorporated into a HMD, such as HMD 100 of FIG. 1. The HMD may project content to a user wearing the HMD. The HMD may be part of an artificial reality system. The array of the near-eye array assembly may be configured to emit light. The optical assembly of the array assembly may be further configured to direct the light to an eye box of the HMD corresponding to a location of a user's eye.

As shown in FIG. 2, the housing 110 may include a near-eye array assembly 210 that includes a subpixel array 215 and an optical assembly 220. The near-eye array assembly 210 may be configured herein to increase resolution and/or brightness of light output by the near-eye array assembly 210, e.g., by rapidly moving the subpixel array 215 and/or one or more components of the optical assembly 220. In some embodiments, the near-eye array assembly 210 may include a two-dimensional subpixel array 215 that operably emits light being collimated by a lens system of the optical assembly 220 (not shown in FIG. 2). However, other architectures of the near-eye array assembly 210 are possible. The subpixel array 215 and the optical assembly 220 together may provide light to an eye box 225. The eye box 225 may be a region in space that is occupied by a user's eye 230. For purposes of illustration, FIG. 2 shows a cross section 200 associated with a single eye 230, but another optical assembly 220, separate from the optical assembly 220, may provide altered light to the other eye of the user. The subpixel array 215 may emit light toward the optical assembly 220. In various embodiments, the subpixel array 215 may include a single array or multiple arrays (e.g., a subpixel array or multiple arrays for each eye of a user). Examples of the subpixel array 215 may include a liquid crystal array (LCD), an organic light emitting diode (OLED) array, an inorganic light emitting diode (ILED) array, an active-matrix organic light-emitting diode (AMOLED) array, a transparent organic light emitting diode (TOLED) array, arrays of quantum dots or quantum rods, some other array, a projector, or some combination thereof. In some examples, subpixel array 215 may include or may be utilized with a backlit system in which the light to each subpixel may be provided by one or more lasers and a laser-light-to-subpixel distribution system such as one or more MEMS arrays.

In various embodiments, the subpixel array 215 may also include an aperture, a Fresnel lens, a convex lens, a concave lens, a diffractive element, a waveguide, a filter, at least one polarizer, a diffuser, a fiber taper, a reflective surface, a polarizing reflective surface, or any other suitable optical element that affects the light emitted from the subpixel array 215. In some embodiments, the subpixel array 215 may have one or more coatings, such as anti-reflective coatings. More details about architecture of the subpixel array 215 and operation of the subpixel array 215 within the near-eye array assembly 210 are provided in conjunction with FIG. 3.

The optical assembly 220 may receive light emitted from the subpixel array 215 and directs the light to the eye box 225 of the user's eye 230. The optical assembly 220 may also magnify the received light, correct optical aberrations associated with the light, and the corrected light may be presented to a user of the HMD 100. In some embodiments, the optical assembly 220 may include a collimation element (lens) for collimating beams of light emitted from the subpixel array 215. At least one optical element of the optical assembly 220 may include an aperture, a Fresnel lens, a refractive lens, a reflective surface, a diffractive element, a waveguide, a filter, or any other suitable optical element that affects light emitted from the subpixel array 215. Optical assembly 220 may also possess one or more refractive elements in the form of a tilted or tiltable glass plate or lens, an LLSO, and/or a birefringent optic. Such a tiltable glass plate may be considered to be a window. Moreover, the optical assembly 220 may include combinations of different optical elements. In some embodiments, one or more of the optical elements in the optical assembly 230 may have one or more coatings, such as anti-reflective coatings, dichroic coatings, etc. Magnification of the image by the optical assembly 220 may allow elements of the subpixel array 215 to be physically smaller, weigh less, and/or consume less power than larger arrays. Additionally, magnification may increase a field-of-view (FOV) of the projected media. For example, the FOV of the projected media may be such that the projected media is presented using almost all (e.g., 110° diagonal), and in some cases, all of the user's FOV. In some embodiments, the optical assembly 220 may be designed so its effective focal length is larger than the spacing to the subpixel array 215, which magnifies an image projected by the subpixel array 215. Additionally, in some embodiments, the amount of magnification may be adjusted by adding or removing optical elements. More details about the optical assembly 220 and operation of the optical assembly 220 within the near-eye array assembly 210 are described in conjunction with FIG. 3.

In some embodiments, a single emissive element, such as a subpixel, may not operably emit more than a single color, and therefore, multiple emissive elements may be used to produce each color pixel, with the size of an array pixel being equal to the sum of the sizes of its constituent subpixels.

In at least one example, light-emitting regions may include regions of light emitted from a backlight unit and passing through a light-modulating layer, such as a liquid crystal layer. Additionally, or alternatively, light-emitting regions may include regions of light corresponding to individual LED elements, quantum dots, quantum rods, OLED elements, plasma cells, electrophoretic array elements, electrowetting array elements, CRT elements, and/or any other suitable subpixel technology.

Subpixel array 215 may be configured to create colors having a wavelength between subpixels operably emitting the highest wavelength light and subpixels operably emitting the lowest wavelength light. Thus, combining light from subpixels with differing spectral properties may be used to produce a broad spectrum of colors visible to a viewer. In some examples, spatial subpixel averaging may produce colors visible to a user by using subpixels in close spatial proximity to enable a pixel to appear to emit a single, variable color.

In some embodiments, variable colors may be produced in an array of subpixels using temporal subpixel averaging. Temporal subpixel averaging may produce colors visible to a user by emitting multiple colors of light from a single subpixel location at different moments in time in rapid succession. The human eye may perceive the rapidly changing colors as a single color emitted from the subpixel location. For example, if a subpixel location flashes red, green, and blue rapidly, the human eye may perceive the subpixel as a white pixel or a pixel color corresponding to a combination of different proportions of red, green, and blue. In some embodiments, additional subpixels may be added to subpixel array 215 to increase the brightness and/or extend the color gamut of the subpixel array 215.

According to various embodiments, a subpixel layout designed for spatial subpixel averaging may include a dense packing of subpixels to maximize resolution. The subpixel layout may further vary the size and shape of subpixels to minimize the sum of the subpixel areas that make up a single pixel. Layout optimization for temporal subpixel averaging, as described herein, may result in very different subpixel layouts compared to spatial subpixel averaging. When optimizing for temporal subpixel averaging, a subpixel may be the same size, shape, and orientation as every other subpixel. This may allow for effective spatial overlap of subpixels through simple translation of the optical path or color-selecting layer, without the need for rotation or other transformations which require more complex mechanisms. In addition, straight lines may exist along which every subpixel color can be found with minimal unused space or repetition to allow full color overlap via translation along a single axis. For example, the linear path may be contiguous with one of each subpixel. In some examples, contiguous objects or regions may have a common border or may be adjacent or touching one another. For example, a contiguous path of subpixels may include each subpixel with no additional subpixels in the path between the subpixels. Similarly, circular paths, substantially circular paths, and/or other circuitous paths (e.g., rectangular paths, hexagonal paths, etc.) may exist along which every subpixel color can be found with minimal unused space or repetition. For example, a circular path may not have a diameter greater than the sum of the lateral dimensions of the subpixels of every subpixel color. In some examples, the lateral dimensions of a subpixel may refer to the spacing between centers of a subpixel. In some examples, the actual lateral dimensions of a light-emitting element of a subpixel may be less than the spacing between the subpixels.

In some embodiments, the housing 110 in FIG. 2 may further include an eye tracking system (not shown in FIG. 2) that determines pupil tracking information for the user's eye 230. The determined eye tracking information may include information about a position (including orientation) of the user's eye 230 in the eye box 225 (i.e., information about an angle of an eye gaze). In one embodiment, the eye tracking system may illuminate the user's eye 230 with structured and unseen light. The eye tracking system can use locations of the reflected structured light in a captured image to determine the position of the user's eye 230. In another embodiment, the eye tracking system may determine the position of the user's eye 230 based on magnitudes of light captured over a plurality of time instants.

In some embodiments, the housing 110 in FIG. 2 may further include a varifocal module (not shown in FIG. 2). The varifocal module may adjust focus of one or more images arrayed on the subpixel array 215, based on the eye tracking information obtained from the eye tracking system. In one embodiment, the varifocal module may adjust focus of the arrayed images and mitigate vergence-accommodation conflict by adjusting a focal distance of the optical assembly 220 based on the determined eye tracking information. In other embodiments, the varifocal module may adjust focus of the arrayed images by performing foveated rendering of the one or more images based on the determined eye tracking information.

FIG. 3 illustrates an example near-eye array assembly 300, in accordance with one or more embodiments. The near-eye array assembly 300 may be configured herein to increase resolution and/or brightness of light output by the near-eye array assembly 300. The near-eye array assembly 300 may include a subpixel array 305, an optical assembly 310, a scanning assembly 315 coupled to at least one or both of the subpixel array 305. The optical assembly 310, and a controller 320 may be coupled to the scanning assembly 315. The near-eye array assembly 300 may, for example, be part of the HMD 100 in FIG. 1. Furthermore, the near-eye array assembly 300 may be part of a HMD implemented as an eyeglass-type platform. In this case, the subpixel array 305 of the near-eye array assembly 300 may be also implemented as a waveguide-based array.

The near-eye array assembly 300 may be an embodiment of the near-eye array assembly 210 in FIG. 2, the subpixel array 305 may be an embodiment of the subpixel array 215 in FIG. 2, and the optical assembly 310 may be an embodiment of the optical assembly 220 in FIG. 2. The subpixel array 305 may emit or be operable to emit light, based in part, for example, on controller instructions from the controller 320. In one embodiment, the subpixel array 305 may be implemented as an OLED array. In another embodiment, the subpixel array 305 may include quantum dots or rods. In other embodiments, the subpixel array 305 may be implemented as an LED array. In still other embodiments, one or more lasers may illuminate subpixels from behind and colored light may be produced by a linear combination of light from a plurality of lasers, or a single laser may excite specific phosphor coatings present in each subpixel. Additionally, or alternatively, subpixel array 305 may be implemented as any suitable type of emissive display array, without limitation.

In some embodiments, a resolution of the subpixel array 305 may be below a threshold resolution (i.e., a number of pixels in each dimension may be below a threshold number per unit distance). In other embodiments, a resolution of the subpixel array 305 may be above the threshold resolution, (i.e., the number of pixels in each dimension may be above the threshold number per unit distance). The subpixel array 305 can be referred to as a sparsely populated array when a distance between adjacent subpixels is at least a size of an emission area of a subpixel (and in some arrangements, is multiple times larger than the size of the emission area of the subpixel). The subpixel array 305 can be referred to as a densely populated array when a distance between adjacent subpixels is less than an emission area of a subpixel. In one or more embodiments, each subpixel position in the subpixel array 305 may be occupied by one emission element or subpixel. The subpixel array 305 can be then referred to as a fully-populated array, which can be considered to be a special case of a densely-populated array. In various embodiments, the array 305 may be implemented herein to have a first resolution of pixels. More details about a pixel/subpixel arrangement within the subpixel array 305 are provided in conjunction with FIG. 5.

The optical assembly 310 may control a FOV at an eye box 325 of an eye 330 and may direct a plurality of light rays 335 emerging from the subpixel array 305 toward the eye box 325. In general, the subpixel array 305 may be implemented herein to have a first resolution of pixels. In accordance with at least one embodiment, the scanning assembly 315 may be configured to shift directions of the light rays 335 in accordance with controller instructions (e.g., provided by the controller 320) such that a virtual array is projected to the eye box 325, wherein the virtual array (not shown in FIG. 3) has a second resolution greater than the first resolution of the subpixel array 305. Thus, a resolution of projected light 340 presented to the eye box 325 may be greater than that of the light rays 335. In addition, a level of brightness (intensity) of the projected light 340 at the eye box 325 may be increased relative to a level of brightness of the light rays 335 when being emitted from the subpixel array 305. In an exemplary embodiment, the scanning assembly 315 may be configured to shift a direction of at least one of the light rays 335 in accordance with the controller instructions, wherein the second resolution of the virtual array presented to the eye box 325 may be increased by at least one virtual pixel relative to the first resolution of the subpixel array 305.

In some embodiments, the optical assembly 310 may include additional optics 355, which may include one or more electro-optical elements. In one or more embodiments, the one or more electro-optical elements of the additional optics 355 may include one or more electro-optical liquid deformable surfaces. Operation of the one or more electro-optical elements in the additional optics 355 may be controlled based in part on, for example, the controller instructions from the controller 320 to shift the directions of the light rays 335 emitted from the subpixel array 305 to increase resolution and/or brightness of the projected light 340 at the eye box 325.

Figure 4:
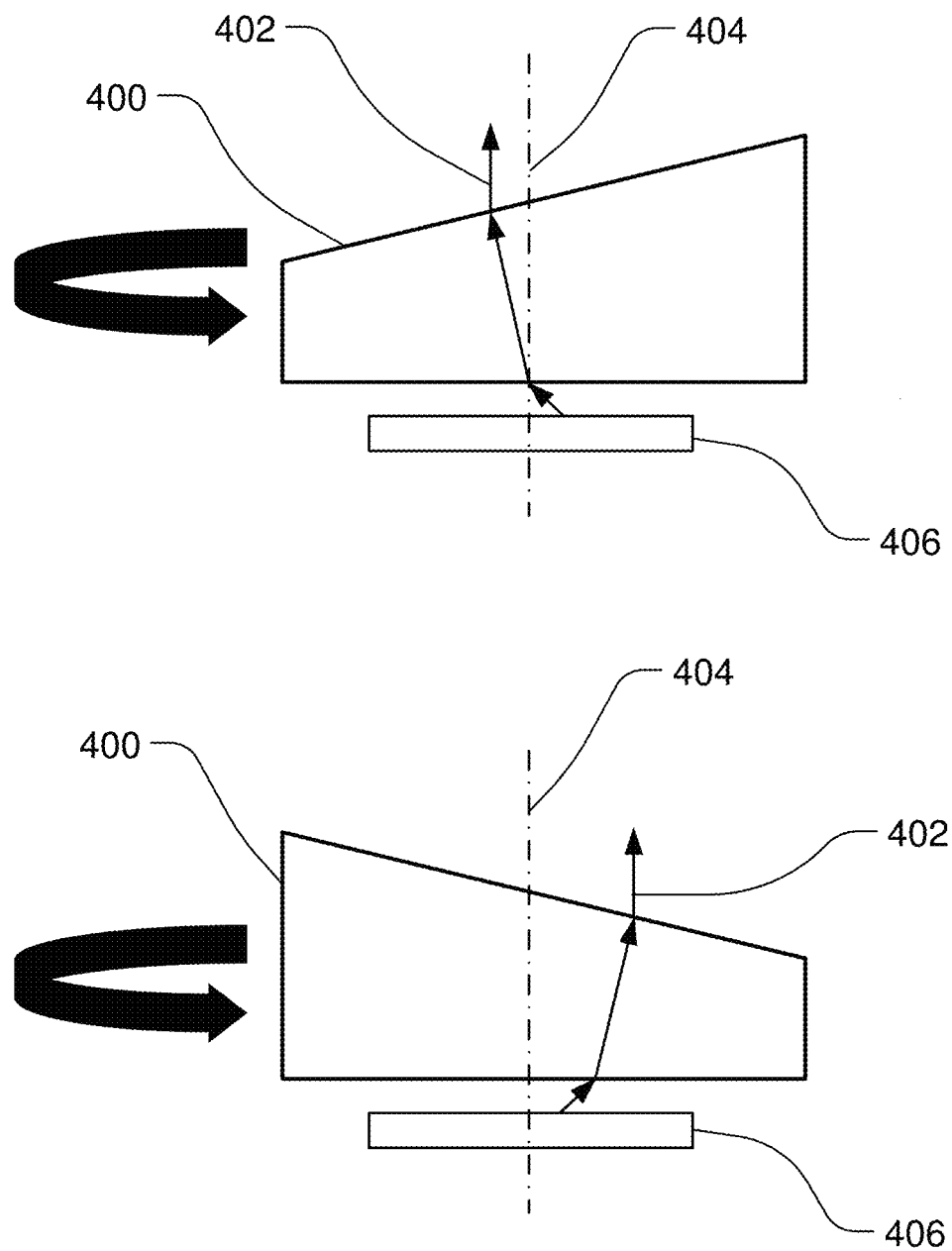
FIG. 4 is a cross-sectional side view of an example LLSO or light deviator for altering a light path disposed over a light-emitting region in accordance with some embodiments.

In some embodiments, the optical assembly 310 may include at least one light deviator or LLSO 345 (see, e.g., the LLSO shown in FIG. 4; see also, FIGS. 6-17B). In one or more embodiments, as will be described in greater detail below, the LLSO 345 in the optical assembly 310 may be so configured as to rotate about an axis perpendicular to or tilted relative to the plane of the subpixel array 305. The rotation characteristics of the LLSO 345 (speed, location, etc.) and/or the tilt and/or pivot of the LLSO 345 may be controlled based in part on, for example, the controller instructions from the controller 320. By rotating the LLSO 345 in the optical assembly 310 about an optical axis of the optical assembly 310 (e.g., based in part on the controller instructions from the controller 320), the directions of the light rays 335 emitted from the subpixel array 305 may be laterally translated with respect to an undeviated ray, thereby increasing resolution, brightness, and/or color of the projected light 340 at the eye box 325. In some embodiments, the LLSO 345 may include two separate rotating LLSOs, either co-rotating or rotating separately. Each LLSO may be separately controlled by the controller 320 or sub-systems of the controller 320. In other embodiments, the LLSO 345 may have the function to tilt and/or to pivot. A drive mechanism 350 may perform the variety of motional conveyances to the LLSO 345, such as rotation, tilt, and/or pivot. The controller 320 may provide to the drive mechanism 350 instructions to the LLSO 345 in order that the LLSO 345 is in a specific position when light from a given subpixel of the subpixel array 305 is instructed by the controller 320 to be emitted.

In some embodiments, the scanning assembly 315 may be configured to shift the directions of the light rays 335 emitted from the subpixel array 305 by rotationally and/or laterally shifting a relative position of the subpixel array 305 to the optical assembly 310 in accordance with the controller instructions (e.g., from the controller 320) at each time interval of a plurality of time intervals in a time period of scanning the subpixel array 305. The scanning assembly 315 may include at least one positioner coupled to the subpixel array 305 for rapidly moving the subpixel array 305 and/or at least one component (e.g., additional optics 355) of the optical assembly 310 along a lateral dimension during the scanning, thereby shifting the relative position of the subpixel array 305 to the optical assembly 310 and increasing resolution and/or brightness of light at the eye box 325. Additional optics 355, part of the optical assembly 310, may include optical components that direct the laterally shifted light emerging from the LLSO 345 towards the eye box 325. These additional optics 355 may be transmissive or reflective, or a combination of both.

In some embodiments, at least one positioner of the scanning assembly 315 may be implemented as a micro-actuator configured to move the subpixel array 305 and/or the at least one component of the optical assembly 310, based in part on, e.g., the controller instructions from the controller 320, thereby increasing resolution and/or brightness of the projected light 340 at the eye box 325. Such a micro-actuator might be a piezoelectric or magnetostrictive device.

Furthermore, in one embodiment, at least one positioner of the scanning assembly 315 may be configured to rotate, to tilt, or to pivot, or any combination thereof, the at least one LLSO 345 of the optical assembly 310 about an axis of the optical assembly 310 (e.g., based in part on the controller instructions from the controller 320) to shift the directions of the light rays 335 emitted from the subpixel array 305, thereby increasing resolution and/or brightness of the projected light 340 at the eye box 325. In some embodiments, scanning assembly 315 may also control the tilt of an LLSO 345 with respect to the subpixel array 305. In some other embodiments, the at least one positioner of the scanning assembly 315 may be configured to shift the subpixel array 305 and/or the at least one component of the optical assembly 310 and to rotate, tilt, and/or pivot least one other component of the optical assembly 310 during a time period (or control in some other manner operation of the other component of the optical assembly 310), thereby shifting directions of the light rays 335 emitted from the subpixel array 305 and increasing resolution and/or brightness of the projected light 340 at the eye box 325. The controller 320 may generate controller instructions for one or more components of the near-eye array assembly 300. The subpixel array 305 may emit the plurality of light rays in accordance with the controller instructions from the controller 320. In some embodiments, the controller 320 may be coupled, via the scanning assembly 315, to at least one of the subpixel array 305 and the optical assembly 310. Thus, the scanning assembly 315 may operate as an electrical or electro-mechanical interface between the controller 320 and at least one of the subpixel array 305 and the optical assembly 310, and any components contained there.

In some embodiments, the controller 320 may instruct at least one positioner of the scanning assembly 315 (e.g., at least one micro-actuator) to shift the relative position of the subpixel array 305 to the optical assembly 310 during a time period (e.g., during a subframe period), based in part on the controller instructions, thereby increasing resolution and/or brightness of the projected light 340 at the eye box 325. In one or more embodiments, the controller 320 may instruct the at least one positioner in the scanning assembly 315 to shift the subpixel array 305 and/or the optical assembly 310 along a lateral dimension during the time period, based in part on the controller instructions.

In some embodiments (e.g., when the subpixel array 305 is implemented as a sparsely populated array), the controller 320 may instruct the at least one positioner in the scanning assembly 315 to move the subpixel array 305 and/or the optical assembly 310 along a lateral dimension during the time period, based in part on the controller instructions. In this manner, the scanning assembly 315 may shift the subpixel array 305 and/or the optical assembly 310 in orthogonal directions to provide scanning and populate the virtual array presented to the eye box 325 with an increased subpixel/pixel resolution.

In other embodiments (e.g., when the subpixel array 305 is implemented as a densely-populated array), the controller 320 may instruct, based in part on the controller instructions, the scanning assembly 315 to translate the subpixel array 305 and/or the optical assembly 310 linearly along orthogonal paths (i.e., lateral dimensions) using at least one positioner of the scanning assembly 315 to effectively shift the subpixel array 305 and/or the optical assembly 310 around in a circular path during a time period of translational movement. In this manner, the densely-populated subpixel array 305 may be presented at the at the eye box 325 as a virtual array having an increased subpixel/pixel resolution.

Furthermore, in an embodiment, the controller 320 may be configured to instruct the at least one positioner of the scanning assembly 315, in conjunction with the actions of the LLSO drive mechanism 350, to rotate and/or to tilt/pivot the LLSO within the optical assembly 310 about an axis of the optical assembly 310 to shift the directions of the light rays 335, based in part on the controller instructions, thereby increasing resolution and/or brightness of the projected light 340 at the eye box 325. In another embodiment, the controller 320 may instruct at least one positioner of the scanning assembly 315 to rotate a collimation element of the optical assembly 310 around an axis of the optical assembly 310 to shift the directions of the light rays 335, based in part on the controller instructions, thereby increasing resolution and/or brightness of the projected light 340 at the eye box 325.

In one or more embodiments, the controller 320 may be directly interfaced with one or more components of the optical assembly 310 (e.g., one or more electro-optical liquid deformable surfaces). The controller 320 may be then configured to control operation of the one or more electro-optical elements in the optical assembly 310 based in part on the controller instructions to shift the directions of the light rays 335 emitted from the subpixel array 305, thereby increasing resolution and/or brightness of the projected light 340 at the eye box 325. For example, the controller 320 may control, based in part on the controller instructions, a level of voltage applied to each electro-optical liquid deformable surface in the optical assembly 310 to change the curvature of that surface and shift the directions of the light rays 335 emitted from the subpixel array 305. In other embodiments, the controller 320 may be configured to control, based in part of the controller instructions, operation of the scanning assembly 315 (e.g., of the at least one positioner in the scanning assembly 315) to control a brightness of a virtual pixel of the virtual array at the eye box 325 based on a number of times over a time period a location at the eye box 325 corresponding to the virtual pixel receives one or more light rays of the plurality of light rays 335 associated with a particular subpixel color emitted from the subpixel array 305.

Furthermore, in some embodiments (e.g., when the subpixel array 305 is implemented as a sparsely populated array), the controller 320 may instruct at least one positioner of the scanning assembly 315 during a time period to control operation of at least one component (e.g., LLSO, collimation element, or electro-optical element) of the optical assembly 310 as well as to move rapidly the subpixel array 305 and/or at least one other component of the optical assembly 310 along a lateral dimension, based in part on the controller instructions. In this manner, a sparsely-populated subpixel array 305 may be presented at the at the eye box 325 as the virtual array having an increased subpixel/pixel resolution.

In other embodiments (e.g., when the subpixel array 305 is implemented as a densely-populated array), the controller 320 may instruct at least one positioner of the scanning assembly 315 during the time period to control operation of at least one component (e.g., LLSO 345, a collimation element, and/or an electro-optical element) of the optical assembly 310 as well as to translate rapidly the subpixel array 305 and/or at least one other component of the optical assembly 310 linearly along orthogonal paths to shift effectively the subpixel array 305 and/or the optical assembly 310 around in a circular path, based in part on the controller instructions. In this manner, the densely-populated subpixel array 305 may be presented at the at the eye box 325 as a virtual array having an increased subpixel/pixel resolution.

In some embodiments (e.g., when the subpixel array 305 is implemented as a sparsely populated array, such as a multi-chromatic sparsely populated array), the scanning may be sufficiently fast such that the eye 330 integrates light from three or more different neighboring subpixels of different color channels that occupy the same subpixel position (e.g., upper-left corner 504 of FIGS. 5A-D) in a cell at different time instants. The three or more different subpixels occupying the same subpixel position in the cell at different time instants would form, for example, a virtual RGB subpixel of the same size as a single-color-channel subpixel. In this manner, a virtual RGB subpixel representing a white pixel can be provided at a subpixel position of the subpixel array 305. In some embodiments, the eye 330 may integrate light from three or more different neighboring subpixels that occupy a subpixel position (e.g., upper-left corner) in a pixel at different time instants such that a brightness of light emitted from the subpixel position is increased so as to compensate for a dim or dead subpixel. In at least one example, the apparent brightness of a hot subpixel may be lowered by, for example, shifting light from the hot subpixel to different subpixel positions during a plurality of subframes, thereby reducing the negative impact of the hot subpixel over the course of a frame.

According to some embodiments, another technique suitable for temporal subpixel averaging may include using the LLSO 345 to alter the light path laterally of various subpixel types (via, e.g., one or more LLSOs) so that colors of multiple subpixel types appear to emit from the same subpixel location without the array device physically moving. FIG. 4 illustrates an example of a rotating prism LLSO 400 that may alter a light path 402 from an exemplary light-emitting region of a subpixel array 406 by one or more subpixel widths, resulting in a subpixel location that includes light from multiple adjacent subpixel types disposed along a circular path centered about and/or surrounding the subpixel location.

In the top example shown in FIG. 4, exemplary light path 402 emits from a location to the left of axis 404, while in the lower example, exemplary light path 402 emits from a location to the right of axis 404. The source of light path 402 has not changed, but the emitted location varies in a circular path in conjunction with rotation of prism LLSO 400. Rotation of the prism LLSO 400 may be configured such that the time it takes to travel one full rotation of the prism LLSO 400 equals the time to transition through the colors of light from various subpixels and such that a single subpixel location may appear to emit a combination of the colors of light during one rotation of the LLSO. A rotating prism LLSO 400 may be utilized with any suitable subpixel layout, including the exemplary subpixel layouts disclosed herein.

Alternative or additional embodiments may include a tilt and/or a pivot of the optical component that provides the lateral-light-shifting capability. The combination of all three parameters, rotation, tilt, pivot, provides a larger set of virtual locations for the translation of the light than say, a simple prism yielding a circular ring as mentioned hereinabove.

The light deviator or LLSO may possess a form of a regular triangular prism. In some embodiments, the prism may be one of a polarizing prism, a Wollaston prism, an amici roof prism, a dove prism, or a pair of Risley prisms. In some alternative or additional embodiments, one or both surfaces of the prism may have optical power. In some alternative or additional embodiments, the optical power may be anamorphic. In some embodiments, the LLSO may be a tilted optical window (e.g., a tilted or tiltable glass plate or lens).

Figure 5A:
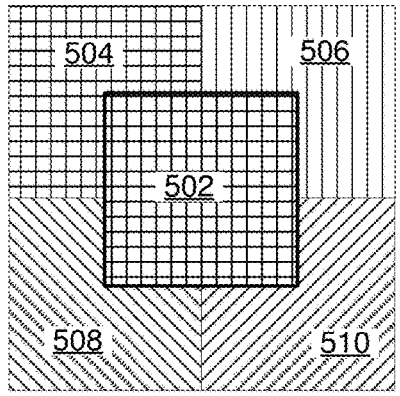
FIG. 5A is a front view of an example light deviator in the form of a rotating LLSO disposed over light-emitting regions and causing a fixed location to display or to project multiple subpixel types in accordance with some embodiments.
Figure 5A:
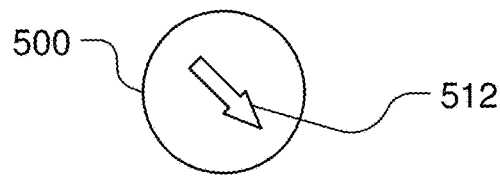
Figure 5B:
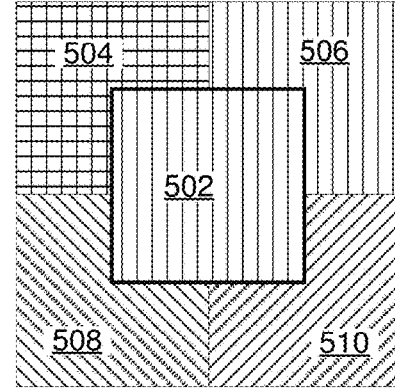
FIG. 5B is a continuation of the example of FIG. 5A in accordance with some embodiments.
Figure 5B:
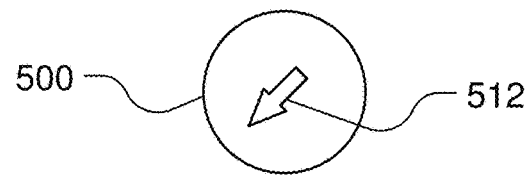
Figure 5C:
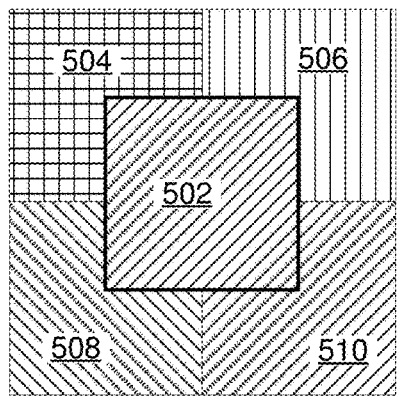
FIG. 5C is a continuation of the example of FIG. 5A in accordance with some embodiments.
Figure 5C:
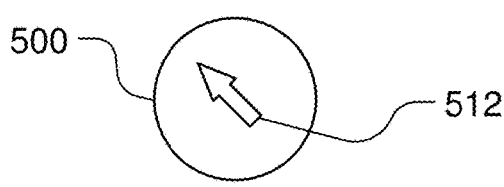
Figure 5D:
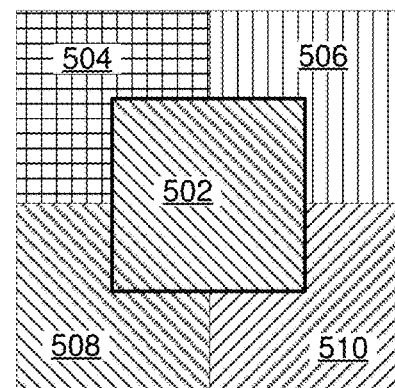
FIG. 5D is a continuation of the example of FIG. 5A in accordance with some embodiments.
Figure 5D:
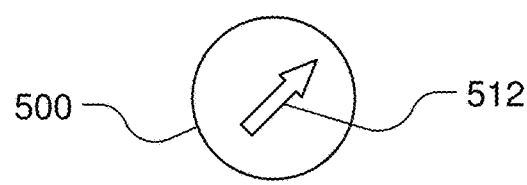

FIGS. 5A-D illustrate lateral shifting examples of a rotating LLSO 500 (see, e.g., rotating prism LLSO 400 illustrated in FIG. 4) altering a light path causing a single location 502 to emit light from four different subpixel types, 504, 506, 508, and 510 during a cycle of rotating LLSO 500. In some examples, each subpixel type may correspond to a different color or spectral distribution of light, as shown by the four distinct patterns of FIGS. 5A-D. Arrow 512 indicates a direction in which the light path is altered and varies dependent on the rotation of rotating LLSO 500. In FIG. 5A, arrow 512 points down and to the right, resulting in single location 502 arraying subpixel type 504, which is located up and to the left of single location 502. In FIG. 5B, arrow 512 points down and to the left, resulting in single location 502 arraying subpixel type 506, which is located up and to the right of single location 502. In FIG. 5C, arrow 512 points up and to the left, resulting in single location 502 arraying subpixel type 510, which is located down and to the right of single location 502. In FIG. 5D, arrow 512 points up and to the right, resulting in single location 502 arraying subpixel type 508, which is located down and to the left of single location 502.

Figure 6:
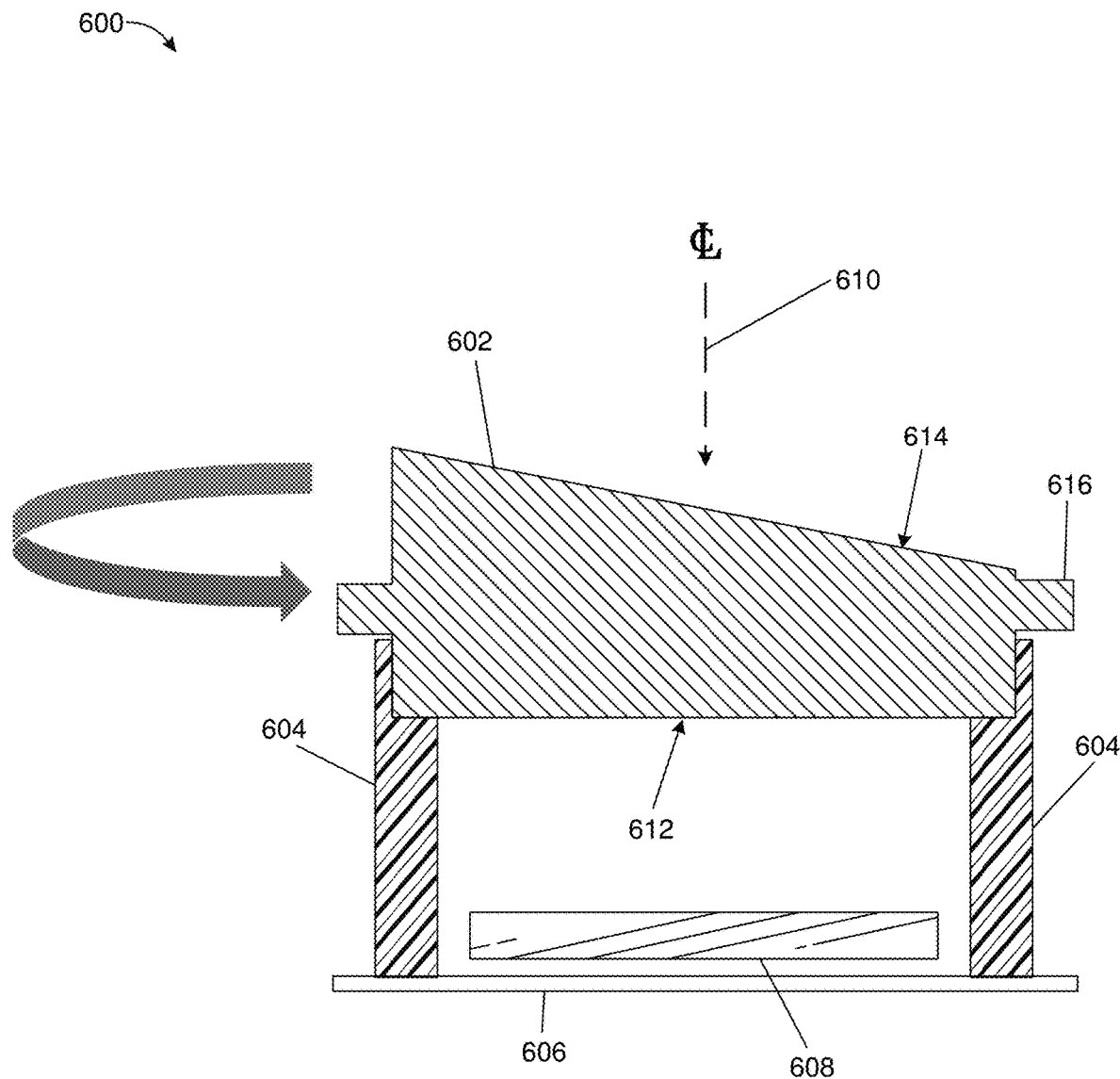
FIG. 6 is a cross-sectional side view of an exemplary light deviator disposed optically downstream from a subpixel array, according to some embodiments.
Figure 7:
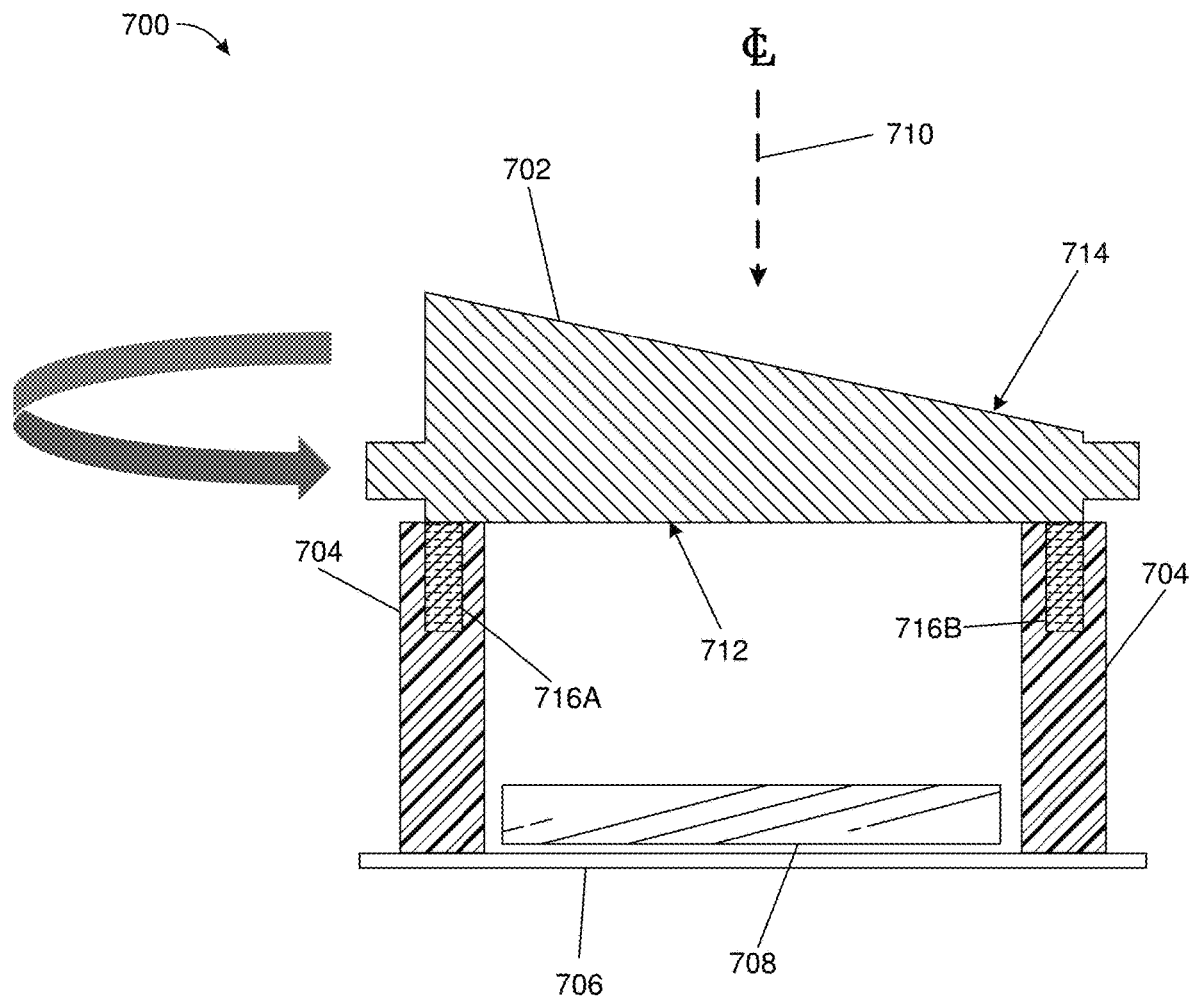
FIG. 7 is a cross-sectional side view of an alternative exemplary light deviator disposed optically downstream from a subpixel array, in accordance with some embodiments.

One or more LLSOs may be disposed in an optically downstream position from one or more subpixel arrays. In some embodiments, as depicted in FIGS. 3, 6, and 7, one or more LLSOs may be optically downstream of one or more subpixel arrays. These LLSOs may be motionally engaged by a mechanical mechanism that transfers motional energy from a source, such as a drive mechanism (e.g. drive mechanism 350 in FIG. 3) and/or motor, to the one or more LLSOs (e.g., LLSO 345 in FIG. 3). Such a mechanism may involve a drive mechanism that is connected either directly or indirectly to a motor, the actions of which are under control of a controller, such as controller 320 of FIG. 3, or one of the sub-systems of the controller 320. The connection between the drive mechanism and at least one LLSO may be by direct engagement through gears or via an intermediate motional energy transfer device, such as a belt or chain. In some embodiments such a transfer of motional energy may be accomplished by a combination of gears and belts. In other embodiments, alternative motional conveyances may be through time-varying magnetic or electrostatic fields. The time-varying nature may induce rotation if the LLSO/holder possesses a non-zero magnetic permeability at least on a portion of its circumference. Some embodiments may also provide a magnetic bearing, again when a portion of the circumferential region of the LLSO is configured with a non-zero permeable magnetic material.

In additional or alternative embodiments, one or more light deviators/LLSOs may be disposed optically downstream from each of several subpixel arrays. Such subpixel arrays may be so configured to emit light of a given spectral distribution. For example, with three such subpixel arrays, each with a distinct spectral distribution, the spectral gamut of normal human photoreceptor response may be covered or may even be extended outside this range, and the separate beams from each of the subpixel arrays may be combined prior to reaching a viewer.

In a geared arrangement, according to some embodiments, an LLSO may be disposed in a holder or cradle that supports it above the subpixel array at a selected distance from the subpixel array. This distance may be adjustable by a threaded movement or by piezoelectrics, or by a motor. In some embodiments, an arrangement may appear similar to that depicted in FIG. 6. In alternative embodiments, an arrangement may appear similar to that depicted in FIG. 7.

LLSOs may have a variety of profiles to accommodate different lateral light shifting properties. Examples of such profiles are depicted in FIGS. 3, 6, and 7, which illustrate exemplary prismatic LLSOs. In various embodiments, LLSOs may have two surfaces, including a first surface nearest the source of light and a second surface optically downstream of the first surface. The light entering the first surface may be laterally shifted by the optical properties of the LLSO to a different lateral location upon exiting the second surface. The composition of an LLSO may be glass, plastic, or any other suitable transparent and/or partially transparent material. In some examples, the LLSO may additionally or alternatively be a tiltable lens that has remotely adjustable optical power that can be modified by actuators or electrodes under the control of a controller (e.g., controller 320 in FIG. 3). In this latter case, the surfaces of the LLSO may be of a different transparent material than the material interposed between the two surfaces of the LLSO.

These two surfaces of an LLSO or light deviator may possess a variety of different optical properties primarily depending on their profiles. In some embodiments, the profiles may be flat, meaning there is no curvature, or, in other embodiments, they may possess optical power from aspheric and/or spherical surfaces. In addition, the profiles may not be azimuthally symmetric about a rotational axis of the LLSO. The location of these asymmetries may be well mapped in advance and the derived information may be stored in the controller (e.g., controller 320 in FIG. 3). The lateral deviation of light through asymmetries may also be known and may be used to control a variable lateral displacement of light.

In summary, the profile of an LLSO or light deviator may be planar, lenticular, and/or prismatic. A planar profile indicates a plane parallel transparent LLSO. A lenticular profile indicates a lens-like shape, thus possessing optical power. A prismatic shape be one in which two planar surfaces meet at an angle. Alternative embodiments may have an LLSO that possesses more than one of these profiles or forms.

FIG. 6 depicts an edge-on view of an exemplary optical assembly 600 which includes a subpixel array 608 mounted directly or indirectly on a surface 606. Disposed optically downstream of the subpixel array 608 is a prism LLSO 602 which may shift the light laterally emerging from one or more subpixels of subpixel array 608 that are operable to emit light. This prism LLSO 602 may possess at least a first surface 612 and a second surface 614 which are used to divert the light from any subpixel by a lateral displacement. The amount of lateral shift depends on the optical properties of the prism LLSO 602, which include at least the refractivity of the optical glass or transparent substance used and the angle that the first surface 612 makes with the second surface 614, or any non-planar curvatures that surfaces 612 and/or 614 may possess. The prism LLSO 602 is mounted above the subpixel array 608 (i.e., optically downstream) and is configured in such a manner as to allow it to rotate with a rotational axis 610, which is also designated as the centerline (₵) in FIG. 6.

In some embodiments, the prism LLSO 602 may be prismatic, which may be dispersive or purely refractive in its optical performance. Either or both of the first surface 612 and second surface 614 of this optical element 602 may possess optical power. The optical element 602 may be composed of several separate elements that are combined as a single entity subsequent to manufacture. Either or both of the first 612 and the second 614 surfaces may be optically coated. Such optical coatings may, for example, function as anti-reflection coatings to reduce ghost images, or may be used to aid in polarizing the light. Optical coatings may also provide a level of optical diffusion. In alternative embodiments, an optical diffuser may be a separate component mated with one of the surfaces of the optical element 602. In other embodiments, the glass or material of the optical component itself may be diffusing. In embodiments with polarizing coatings, these may be coated in a pattern on the surfaces 612 and/or 614. Accurate knowledge of the position of these coatings on prism LLSO 602 may be programmed into the controller 320. An additional rotatable polarizer (not depicted in FIG. 6 or 7) may be present above or below the prism LLSO 602. Thus, controlling the position of the rotatable polarizer in combination with that of the prism LLSO 602 can facilitate modulation of light to a viewer. In some embodiments, the coatings on the prism LLSO 602 may function as a polarizer, while an additional element located downstream or upstream may function as that of the analyzer.

The prism LLSO 602 may be mounted on a frame, holder, or support system, such as that seen in the view in FIG. 6, which depicts a cross-sectional view of the support assembly 604. This support system may also have a mechanism that allows the optical element 602 to rotate about the centerline axis (L) 610. A drive mechanism (not depicted in this FIG. 6), may engage the rotating mechanism or the support assembly 604 of the prism LLSO 602, or the prism LLSO 602 directly to provide the rotational movement. Such an engagement may be by gears or by belts, or a combination thereof, or other suitable mechanical arrangements to establish rotation in the prism LLSO 602. For example, rotational contact region 616 on an outer circumferential region of prism LLSO 602 may include gear teeth and/or a contact surface configured to contact and be driven by a corresponding driving gear and/or belt. Contact region 616 (e.g., gear teeth) may be part of prism LLSO 602 (e.g., contact region 616 may be integrally formed with prism LLSO 602) and/or may be formed of a separate material that is coupled to a periphery of LLSO 602. Additionally, or alternatively, support assembly 604 may include gear teeth and/or a contact surface configured to contact and be driven by a corresponding driving gear and/or belt. FIGS. 8-14 provide schematics of embodiments of possible configurations of how motional energy may be engaged between multiple prism LLSOs 602 present in, for example, HMD 100 of FIG. 1.

The support assembly 604 may, for example, be metal or plastic or a transparent material such as glass or plastic. In an embodiment in which the support assembly 604 is non-transparent, then an aperture may be present in the holder into which the prism LLSO 602 may be held in place. In an embodiment in which the support assembly 604 is transparent, the prism LLSO 602 may be held inside the support assembly 604. Alternatively, the prism LLSO 602 may be optically attached to the support assembly 604 by canonical means used in optics such as an appropriate adhesive. This adhesive may or may not provide a permanent attachment between the prism LLSO 602 and its support assembly 604. Accordingly, the prism LLSO 602 may rotate within the support assembly 604, which may be stationary with respect to rotating prism LLSO 602, or the prism LLSO 602 and the support assembly 604 may be attached to each other and may rotate together. Hereinafter the term LLSO may refer to either an LLSO configured to rotate, tilt, and/or pivot, or a combination LLSO disposed in a holder, the holder being configured to facilitate movements in several degrees of freedom. In at least one embodiment, the LLSO may be disposed in a gimbal.

FIG. 7 depicts an alternative embodiment with an optical assembly 700 similar to that of optical assembly 600. In this depiction, a subpixel array 708 may be mounted either directly or indirectly on a surface 706. A prism LLSO 702, which may include exemplary first and second surfaces 712 and 714 corresponding to first and second surfaces 612 and 614 shown in FIG. 6, may be mounted on a support assembly 704 that disposes the prism LLSO 702 to be optically downstream from one or more subpixel arrays 708. Only one subpixel array has been indicated in FIGS. 6 and 7; however, in some embodiments, a multitude of subpixel arrays may be so configured to be optically upstream from a single prism LLSO 702, which provides lateral shifting properties to the light emerging from the multiple arrays. The prism LLSO 702 may also rotate about an axis 710 which is also designated as the centerline (L).

In this configuration, tilt of prism LLSO 702 may be partially or entirely controlled by one or more mechanisms 716A/716B configured as a stationary part of the support assembly 704 of the prism LLSO 702. In some embodiments, the components of prism LLSO 702 may be separately manufactured or they may be manufactured as an integral unit. The optical profile of the prism LLSO 702 may be prismatic, planar, a lens, or a combination thereof and may possess optical power. The mechanism(s) 716A/716B may include separately adjustable entities, which, when actuated, adjust the tilt of prism LLSO 702/support assembly 704. Such adjustments may be performed by micromotors, providing a linear or threaded motion. In the case of threaded motion, the motor would engage a threaded element in contact with the LLSO and provide height adjustment. Alternative or additional embodiments may possess piezoelectric actuators or other suitable actuators to provide tilt and/or pivot adjustments.

Figure 8:
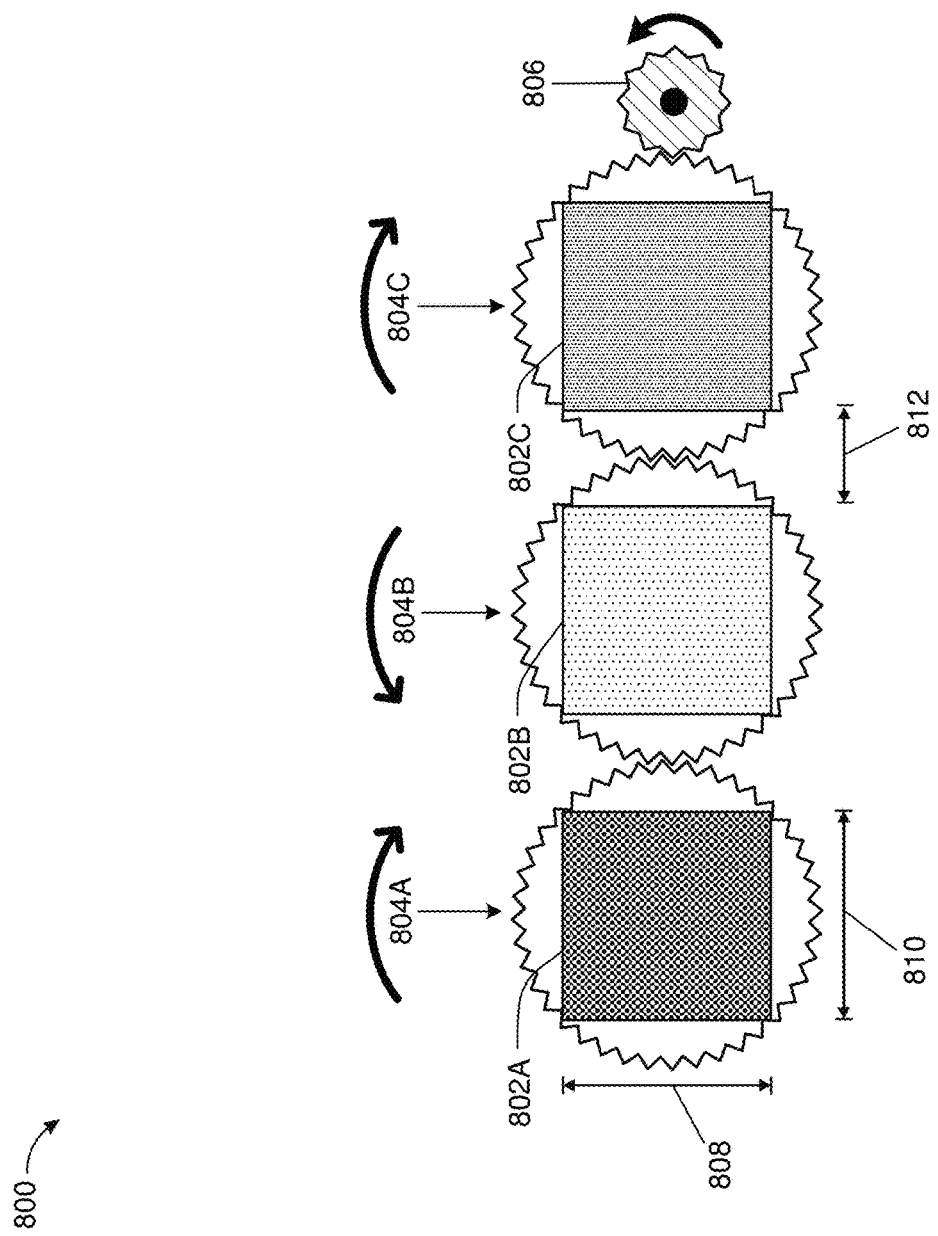
FIG. 8 is a front view of an arrangement of separate subpixel arrays with separate exemplary light deviators, linearly configured, according to some embodiments.

FIG. 8 depicts an embodiment of a linear arrangement 800 of three separate LLSOs 804A, 804B, and 804C (e.g., prism LLSOs), each of which is optically downstream of a respective subpixel array of subpixels (i.e., subpixel arrays 802A, 802B, and 802C shown in FIG. 8). In some embodiments, each of subpixel arrays 802A, 802B, and 802C may emit light of a separate spectral distribution. For example, subpixel arrays 802A, 802B, and 802C may respectively emit light of a blue spectral distribution, a green spectral distribution, and a red spectral distribution. Separate beams from each of subpixel arrays 802A, 802B, and 802C may be optically combined prior to reaching a viewer such that the emitted light appears to a viewer as a single display including images formed of each of the respective colors. In FIG. 8 only three sets of subpixel arrays and LLSOs are present, though in other embodiments, the number may be any other suitable plurality of subpixel arrays and/or LLSOs. The linear arrangement 800 may be repeated in a transverse direction to create a two-dimensional arrangement of subpixel arrays. Such a pattern may, for example, resemble a hexagonal closest-packed configuration. The subpixel arrays may have lateral dimensions 808 and 810 that range from about a few mm to about a few cm. The separation distance between subpixel arrays 812 may range from approximately one mm to about 10 mm.

Each of the subpixel arrays 802A, 802B, and 802C may be configured with a plurality of subpixels. In some embodiments, a subpixel array may possess subpixels which may emit light in several different spectral distributions. In other embodiments, subpixels in each subpixel array may emit light with the same spectral distribution, which varies between the subpixel arrays 802A, 802B, and 802C.

In FIG. 8, the placement of the drive mechanism 806 may be placed in any convenient location. The drive mechanism can engage any one (or two) of the LLSOs 804A, 804B, and 804C, by its judicious placement. As the LLSOs 804A, 804B, and 804C are mutually engaged mechanically with each other by gear teeth, a single drive mechanism may suffice to cause the LLSOs 8804A, 804B, and 804C to rotate mutually, albeit not all in the same rotational direction, as the rotation arrows in FIG. 8 suggest. These direction of rotation arrows may naturally be in the opposite direction to what is shown in FIG. 8.

Drive mechanism 806 of FIG. 8 may be any suitable motor, such as a micro-stepping motor, DC-brushless motor, etc. Alternatively, drive mechanism 806 may be a transfer gear whose shaft is connected via gears, belts, or shafts to the drive motor. The motional conveyance to the LLSOs 804A, 804B, and 804C may also be by magnetic induction. In other embodiments, micro- or nano-motors may produce the mechanical motion to rotate or to provide any other degree of motional freedom of any one or all of the light deviators/LLSOs.

Figure 9:
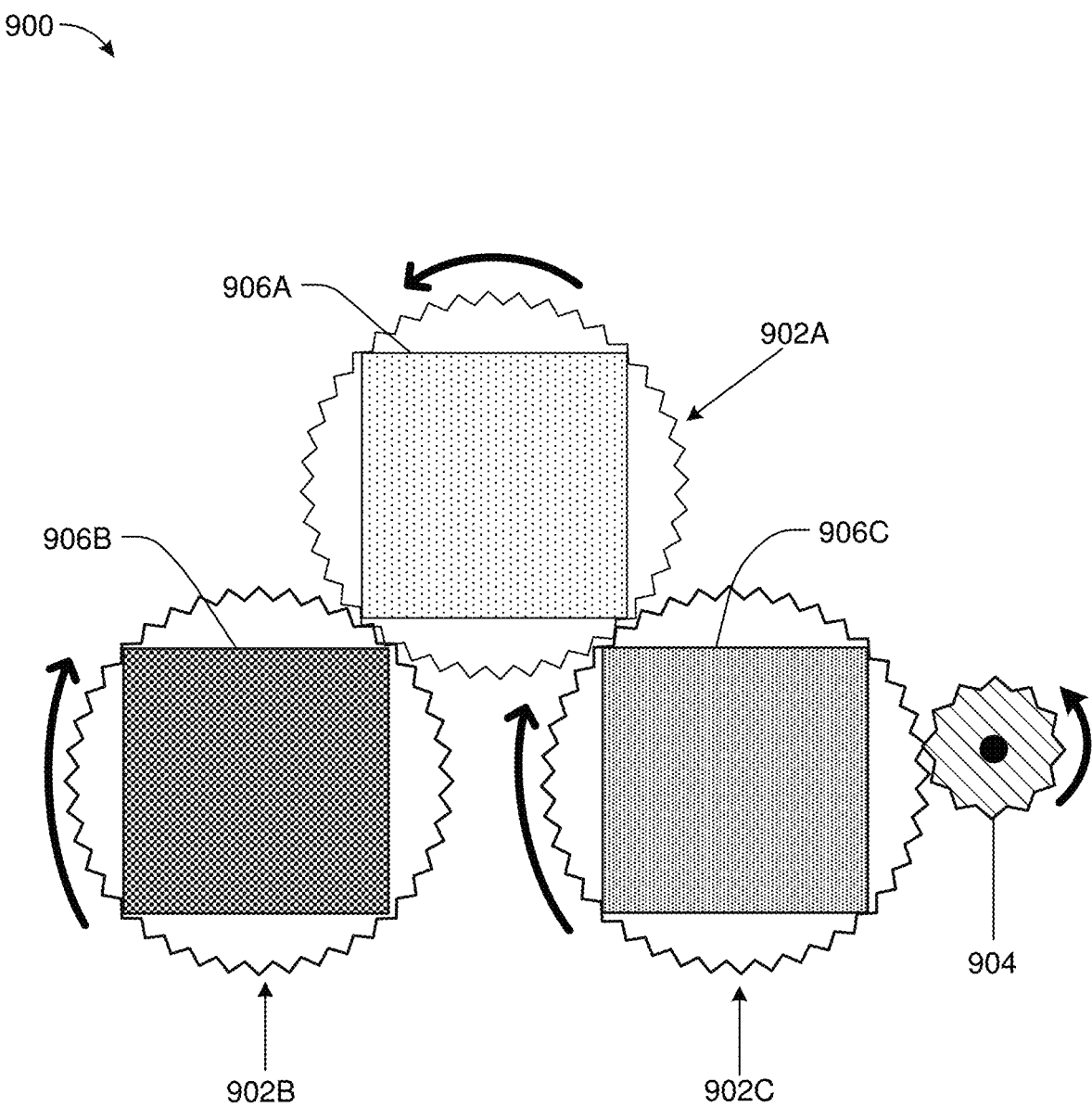
FIG. 9 is a front view of an arrangement of separate subpixel arrays with separate LLSOs, configured in a triangular pattern, according to some embodiments.

In an alternative embodiment, FIG. 9 depicts an embodiment 900 of three subpixel arrays 906A, 906B, and 906C each with its own rotatable LLSOs 902A, 902B, and 902C. As in FIG. 8, two of these three LLSOs 902A, 902B, and 902C may be mutually mechanically engaged via gear teeth. Thus, rotating one of the LLSOs, 902A, 902B, or 902C, may rotate the other two LLSOs. The drive mechanism 904 may engage any one of these three LLSOs 902A, 902B, and 902C at any rim location of a single LLSO 902A, 902B, or 902C.

Figure 10:
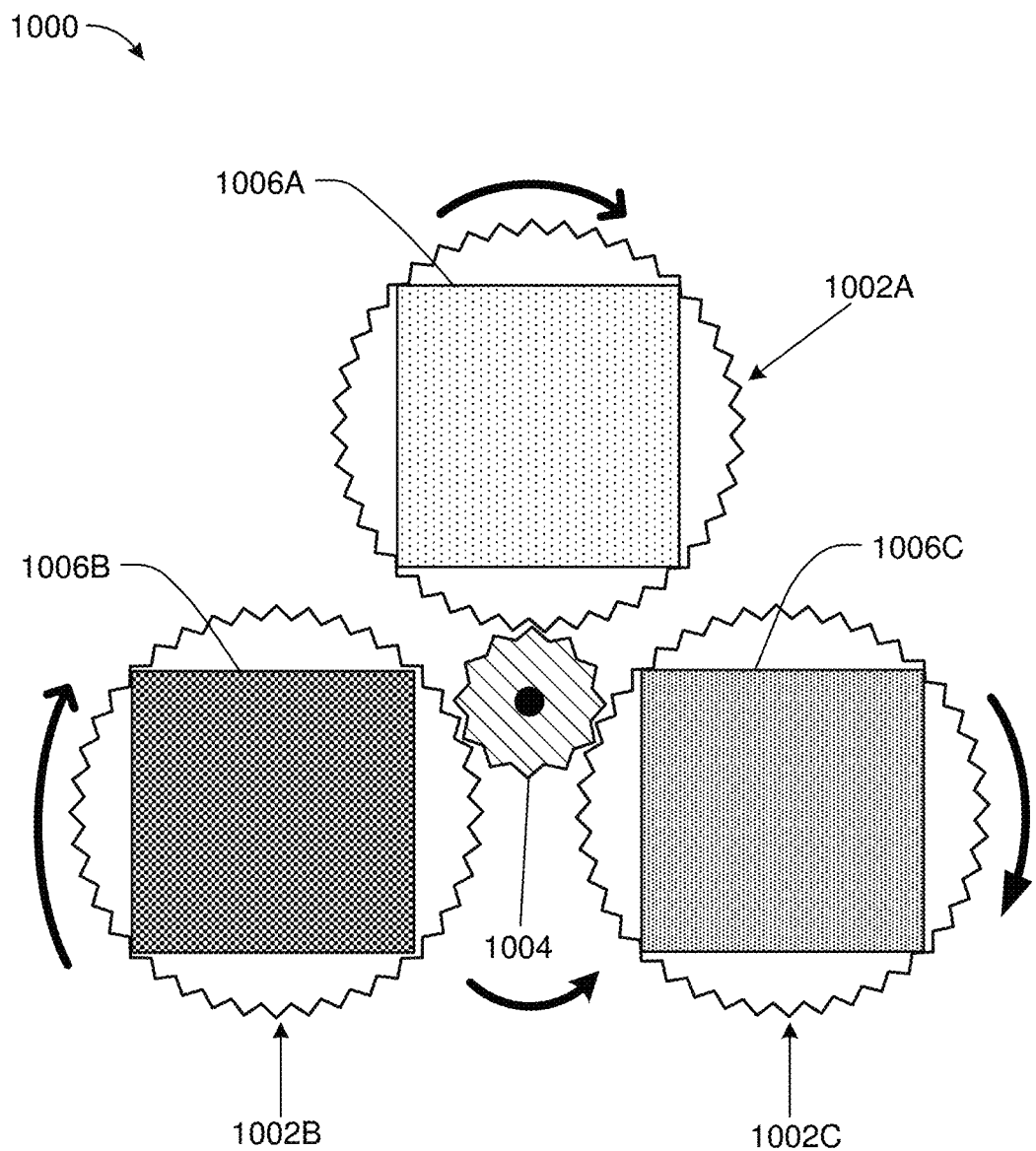
FIG. 10 is a front view of an arrangement of separate subpixel arrays with separate LLSOs, configured in an alternative triangular pattern, according to some embodiments.

In an alternative embodiment, FIG. 10 depicts another embodiment 1000 with three subpixel arrays 1006A-C each with a LLSO 1002A-C disposed optically downstream. Each of these LLSOs 1002A-C may possess gear teeth on its rim/circumferential region. However, unlike the configurations 800 and 900 of respective FIGS. 8 and 9, with these LLSOs 1002A, 1002B, and 1002C there is no mutual engagement between LLSOs 1002A, 1002B, and 1002C, but each of these LLLSOs is mechanically engaged with a single centralized drive mechanism 1004 as it is centrally disposed between the triangular configuration of the three subpixel arrays 1006A, 1006B, and 1006C and the three LLSOs 1002A, 10026, and 1002C.

Figure 11:
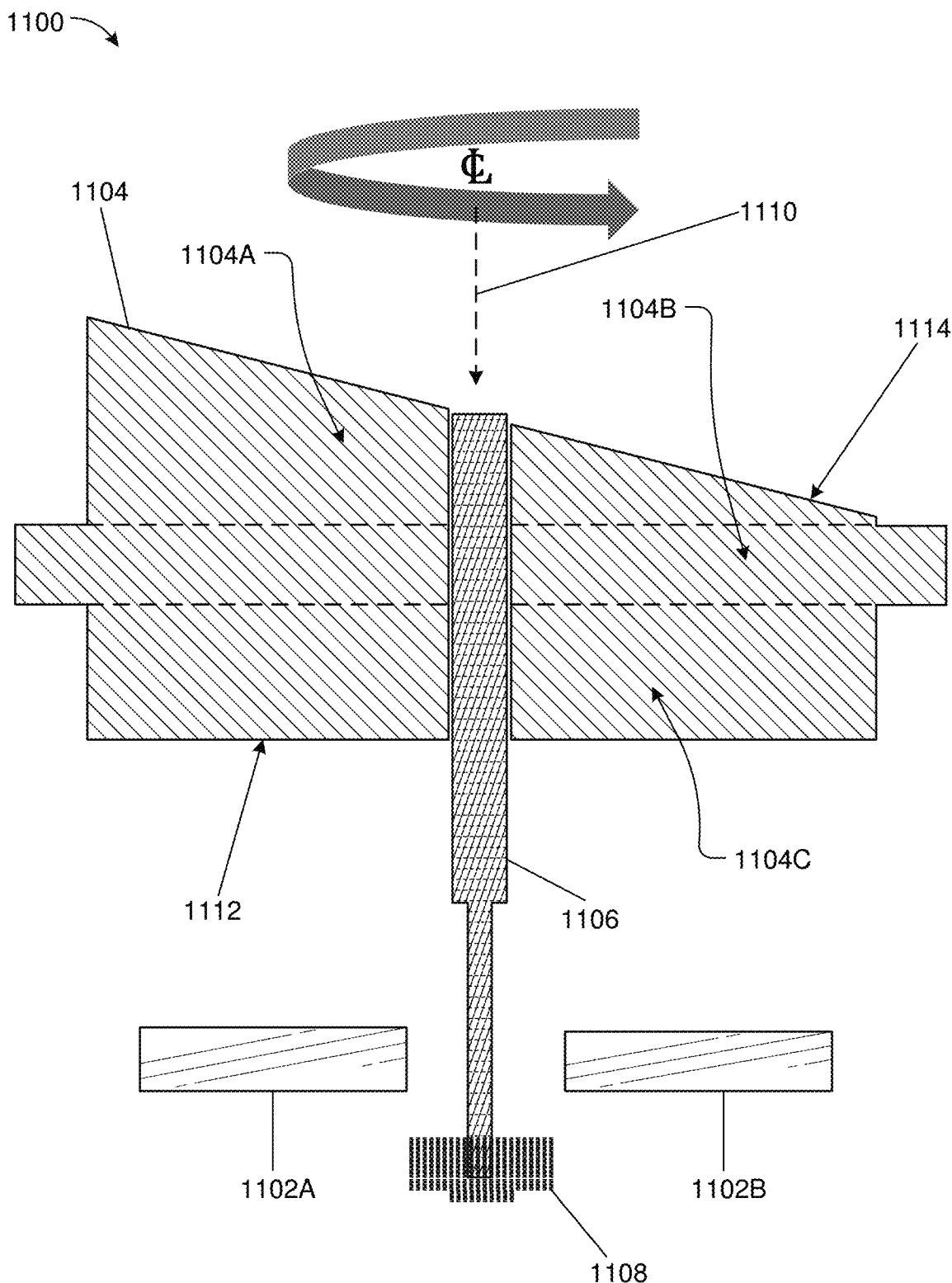
FIG. 11 is a cross-sectional side view of an exemplary light deviator or LLSO that possesses a centrally disposed spindle which provides rotational motion and/or axial support for rotation to the light deviator/LLSO, according to some embodiments.

In an alternative embodiment, a single LLSO may be disposed optically downstream and encompass a region overlapping a plurality of subpixel arrays as shown in FIG. 11. In such an arrangement, a single LLSO 1104 may be rotationally engaged with, for example, a drive mechanism 1108 either by a gear or by a belt. Alternatively, the LLSO 1104 may be rotationally engaged at the circumference of element 1104B. The single LLSO 1104 optically disposed downstream of a plurality of the depicted subpixel arrays 1102A and 1102B (additional subpixel arrays not shown for clarity) may provide its light shifting capability for any subpixel disposed thereinbelow.

In FIG. 11, the single LLSO 1104 is shown with a centrally disposed spindle 1106 about which the LLSO rotates. The axis of rotation 1110 is also designated in FIG. 11 with a centerline (₵). The LLSO 1104 may be composed of a single component or may be assembled from multiple components.

In an embodiment with a refractive LLSO 1104, such as a prism, the amount of light shifting ability may be determined by the refractivity of the transparent material of which the component 1104 is made. In some embodiments, LLSO 1104 may include exemplary first and second surfaces 1112 and 1114 corresponding, for example, to first and second surfaces 612 and 614 shown in FIG. 6. Another design parameter in this embodiment may also be the prismatic angle, or apex angle, between first and second surfaces 1112 and 1114. Alternative embodiments provide an LLSO with surface curvatures as well as asymmetric profiles, on either, or both, of the surfaces. When first and second surfaces 1112 and 1114 are planar, the thickness (distance between the two surfaces) may increase from approximately 10 microns to approximately 500 microns from one lateral side of the LLSO 1104 to the opposite lateral side. For example, the thickness of the LLSO 1104 between first and second surface 1112 and 1114 may increase by approximately 50 microns from one side to the opposite side.

In some embodiments, LLSO 1104 may include regions 1104A, 1104B, and 1104C, as shown FIG. 11. Regions 1104A, 1104B, and/or 1104C may be integrally formed of a single material and/or may be separate components coupled to each other. In at least one example, the region 1104B of LLSO 1104 onto which the region 1104A may be abutted may provide dimensional stability to the region 1104A in being the region and/or element to which the spindle 1106 is attached. There may be high torques placed on the element directly connected to the spindle, and strains may develop at the interface of the region 1104A with that of the spindle 1106, due to the small surface interface between the region 1104A and the spindle 1106. By abutting and/or integrally forming the region 1104A with the region 1104B, which is attached to the spindle 1106, the strain on the component 1104A may thus be reduced. The region 1104C may provide additional optical properties of greater optical path than what the region 1104A may alone provide. The regions 1104A, 1104B, and 1104C may each be formed of a transparent material, such as glass or plastic. In other embodiments, one or more of these regions 1104A, 1104B, and 1104C may be made of a transparent mineral such as calcite. In some embodiments at least one of the regions 1104A, 1104B, or 1104C may be of a birefringent transparent material.

In the case of a laser-based backlit display system, using, e.g., MEMS to direct light to mimic a pixelated array, the region 1104C and/or another component disposed optically downstream of the laser source may be an optical diffuser to reduce the effects of coherent laser light. The discussion associated with FIGS. 15A-B covers such embodiments more fully.

In FIG. 11, the spindle 1106 may be connected either directly or indirectly to a motor 1108. Direct connection may be through gears or belts, or a combination thereof, to the actual driving motor. Alternatively, the spindle 1106 may be disposed only to provide rotational support while the force that produces the rotation is engaged at the circumferential region of the LLSO 1104 (e.g., a rotational contact region such as rotational contact region 616 shown in FIG. 6). In such an example, spindle 1106 may be stationary relative to rotational LLSO 1104, which rotates about spindle 1106.

Figure 12:
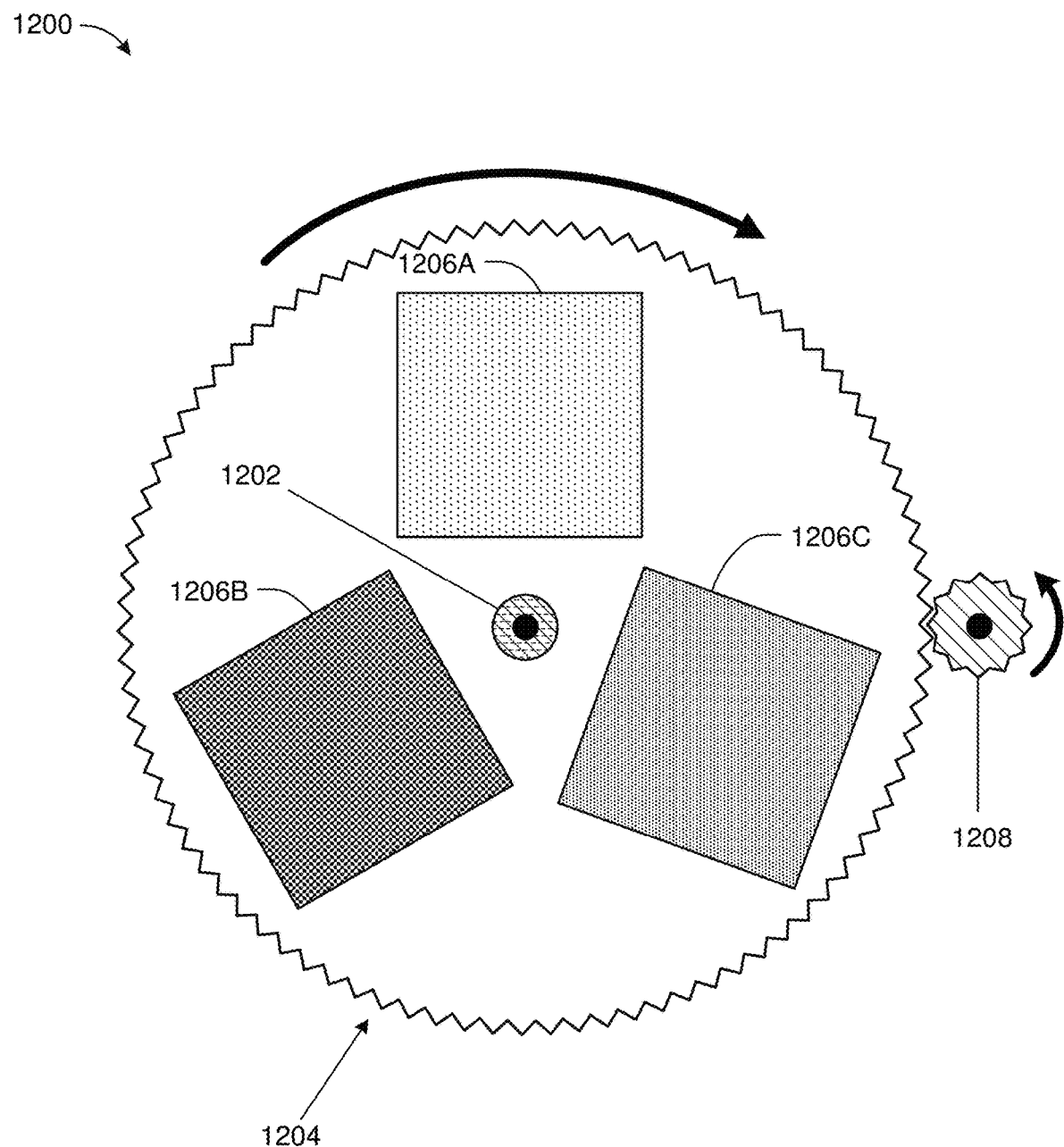
FIG. 12 is an axial view of a single exemplary light deviator (or LLSO) disposed optically downstream of three separate subpixel arrays and, in accordance with some embodiments, may be a similar configuration as that shown in FIG. 11.

In some embodiments, an assembly 1200 may be driven additionally alternatively, not from a centrally disposed spindle but from the edge or rim, as is depicted in FIG. 12. In this embodiment, a single LLSO 1204 may cover a plurality of subpixel arrays 1206A, 1206B, and 1206C. While three subpixel arrays are illustrated in this depiction, fewer or additional subpixel arrays are equally viable. In this embodiment, the single LLSO 1204 may rotate about a centrally disposed spindle 1202. The engagement of the LLSO 1204 with that of the drive mechanism 1208 may be by gear teeth on the rim of the LLSO 1204 and on the drive mechanism 1208. The subpixel arrays disposed beneath any LLSO may have any appropriate relative arrangement and orientations.

Figure 13A:
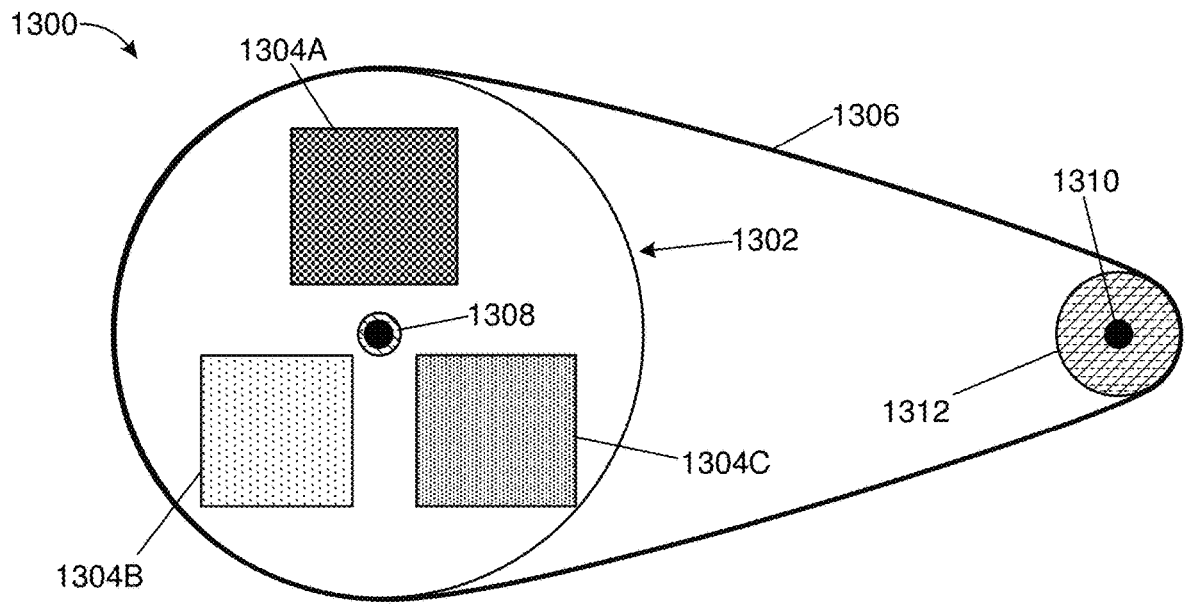
FIG. 13A is an axial view of an alternative embodiment for motional conveyance, in accordance with some embodiments.
Figure 13B:
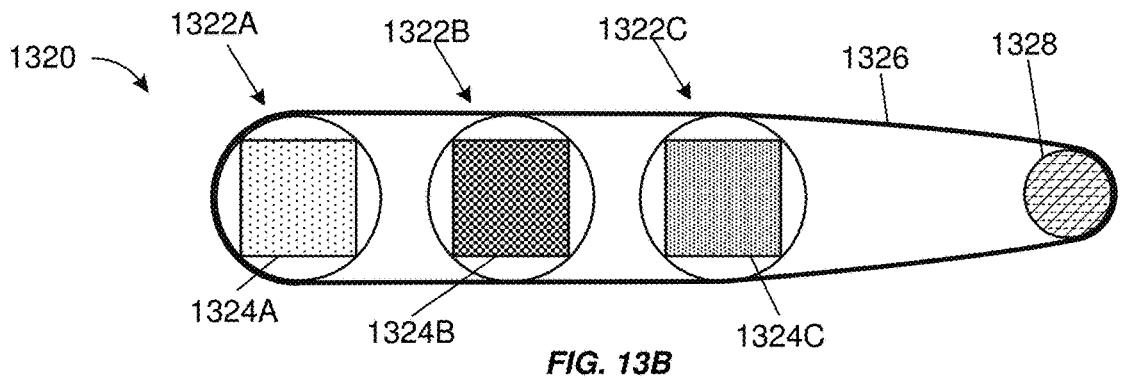
FIG. 13B is an axial view of an alternative embodiment of a configuration for motional conveyance, in accordance with some embodiments.
Figure 13C:
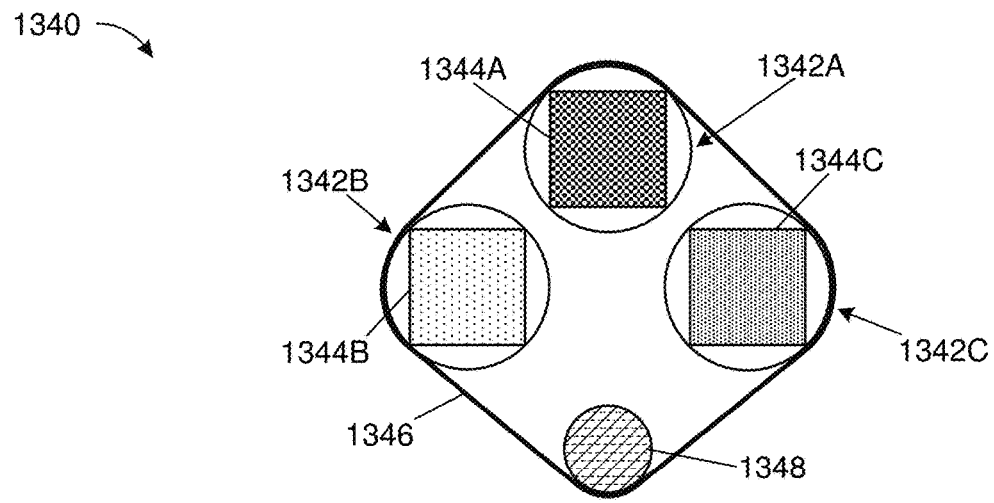
FIG. 13C is an axial view of an alternative embodiment of a configuration for motional conveyance, in accordance with some embodiments.

An alternative embodiment for the rotational engagement between one or more LLSOs and at least one drive mechanism, may be through the use of belts, as depicted in FIGS. 13A-C. Nevertheless, although not depicted or illustrated, a combination of belts and gears is also viable. Also viable, in some embodiments, may be to use electromagnetic time-varying fields to induce rotation.

An alternative mechanical engagement system to that of FIG. 12 may use a belt-driven system 1300 schematically depicted in FIG. 13A, in which the motor or drive mechanism is disposed more laterally than axially when compared to the examples depicted in FIGS. 11-12. In FIG. 13A, an LLSO 1302 may be disposed optically disposed downstream of a set of subpixels, illustrated by the subpixel arrays 1304A-C. In one embodiment, the LLSO 1302 may maintain its position and rotation ability through a centrally disposed spindle 1308. An alternative to this would be that the LLSO 1302 maintains its position by circumferential support, such as, for example, a bearing (e.g., a mechanical, air, and/or magnetic bearing). In FIG. 13A, the LLSO 1302 may be mechanically engaged with a drive mechanism 1312 via a belt 1306. The drive mechanism 1312 may itself be a motor or the mechanical motional transference may occur through other mechanical means. The drive mechanism 1312 may have a centrally disposed axis, such as spindle 1310.

FIG. 13B presents an exemplary belt-driven system 1320 similar in layout to that of FIG. 8, in which there are three separate LLSOs 1322A-C each optically downstream from a separate set of subpixels, which are here depicted as being compartmentalized into three separate subpixel arrays 1324A-C. In both FIGS. 8 & 13B, the centers of rotations of the LLSOs may be collinearly arranged. A drive mechanism 1328 may provide motional conveyance or engagement by a belt 1326. In this collinear arrangement of subpixel arrays 1324A-C, all three of the LLSOs 1322A-C may co-rotate in the same rotational direction.

In another embodiment, an exemplary belt-driven system 1340 of FIG. 13C may include a triangular arrangement similar in layout to that depicted in FIGS. 9 and 10. In this case, mechanical engagement may be by a belt (similar to those of FIGS. 13A-B) extending between each of three LLSOs 1342A-C and their respective optically upstream set of subpixels (here depicted as separate subpixel arrays 1344A-C). A belt 1346 may provide motional conveyance from a drive mechanism 1348. The belt 1346 may be disposed on the side of the drive mechanism away from the three LLSOs 1342A-C as it is presented in FIG. 13C. Alternatively, the belt 1346 may be disposed at a point on 1348 nearer the three LLSOs 1342A-C. The belt 1346 would be tensed by being on the opposite side of the drive mechanism 1348, and more centrally located to that shown in FIG. 13C.

Figure 14:
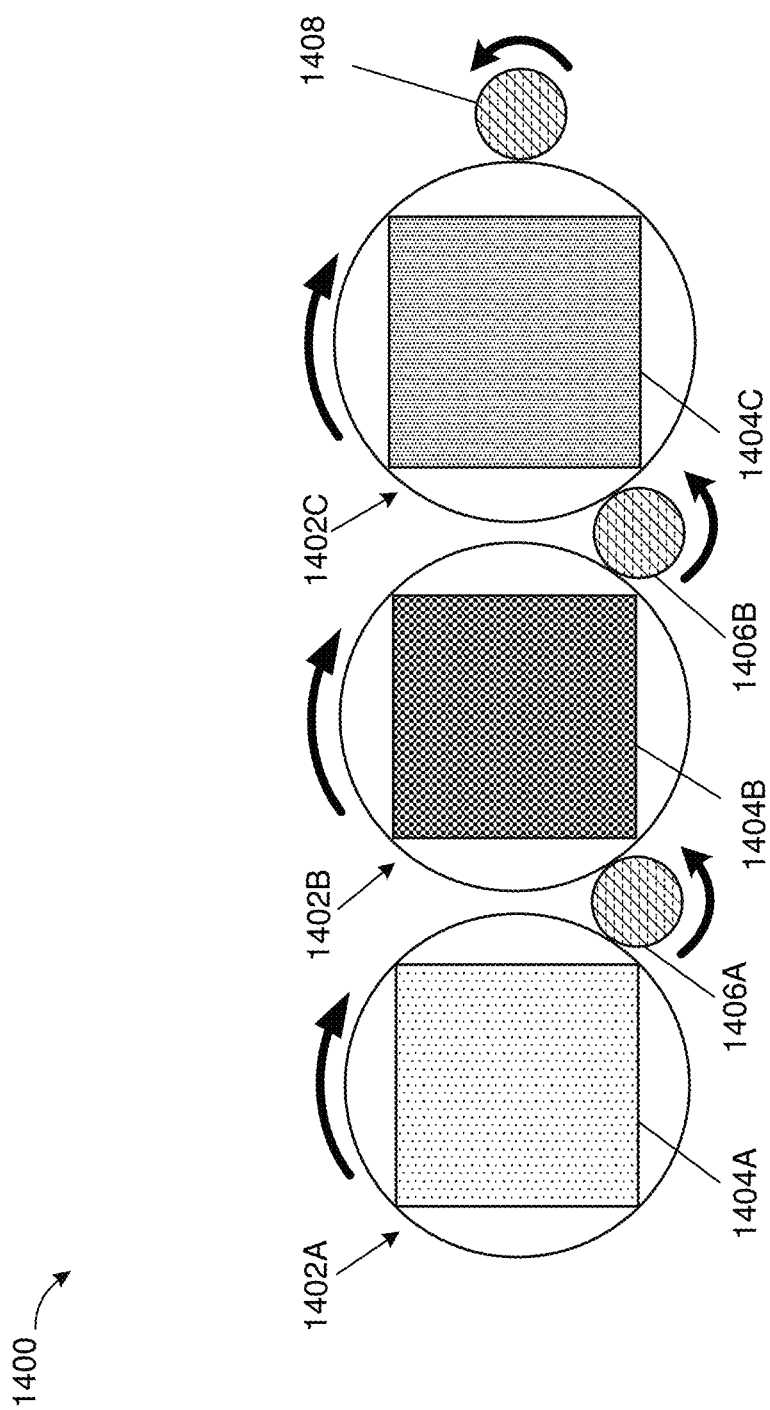
FIG. 14 is an aerial view of an arrangement of separate subpixel arrays with separate LLSOs, linearly configured, according to some embodiments.

Another example of the use of gears is depicted in FIG. 14. The arrangement 1400 shown in FIG. 14, similar to that which is depicted in FIG. 8, has a row of three LLSOs 1402A, 1402B, and 1402C that respectively include subpixel arrays 1404A, 1404B, and 1404C. However, LLSOs 1402A-C may not be in direct engagement with each other, but may instead use, for example, idler gears to convey rotational motion between LLSO 1402A-C. As illustrated in FIG. 14, an idler gear 1406A may be disposed between LLSOs 1402A and 1402B. Similarly, an idler gear 1406B may be disposed between LLSOs 1402B and 1402C. A driving gear 1408 may engage one of the LLSOs, such as LLSO 1402C shown in FIG. 14, and provide rotational conveyance. Thus, a sequence of rotational transfers may occur: from driving gear 1408 to LLSO 1402C, to idler gear 1406B, to LLSO 1402B, to idler gear 1406A, and finally to LLSO 1402A.

Figure 15:
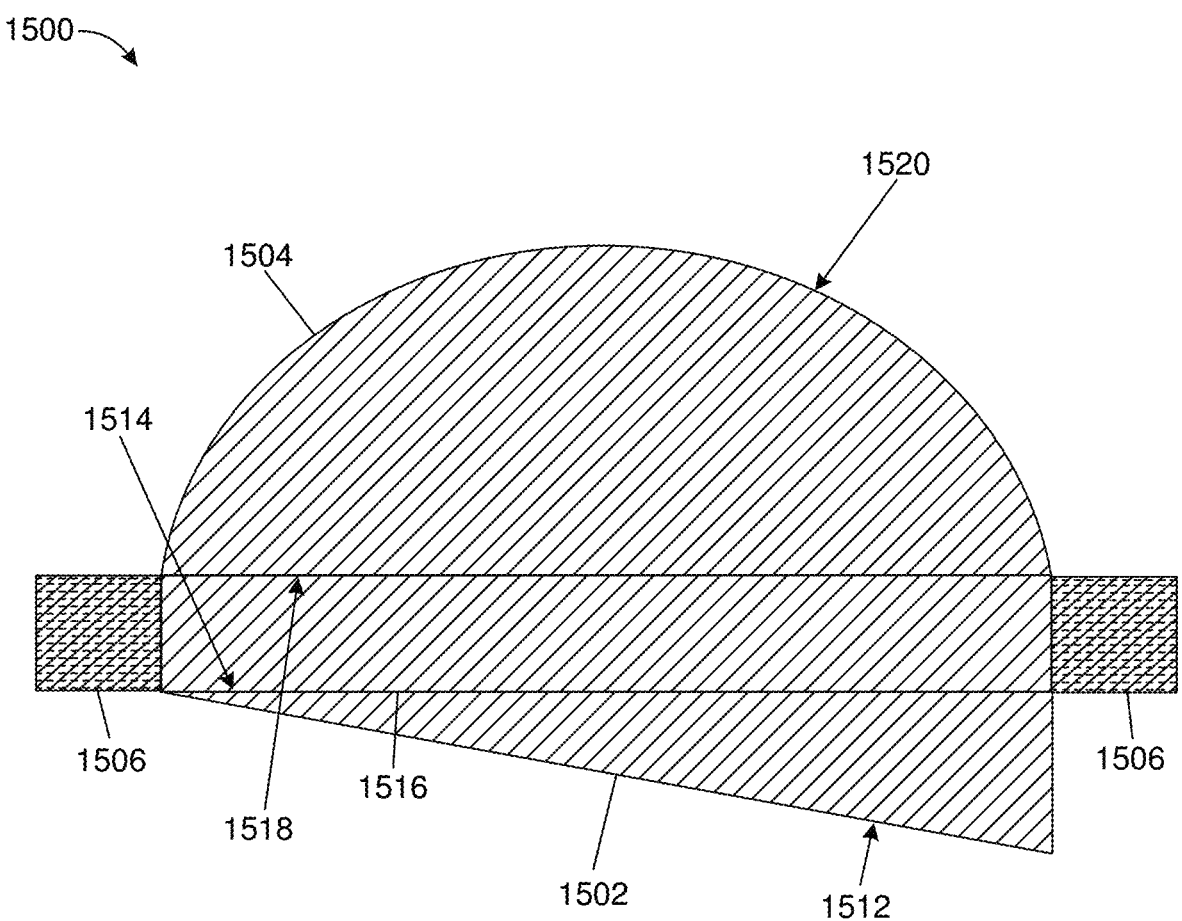
FIG. 15 is a cross-sectional side view of an alternative embodiment of an exemplary light deviator, in accordance with some embodiments.

FIG. 15 presents an alternative embodiment for an exemplary LLSO 1500. In this LLSO 1500 there are depicted three optically transparent components: 1502, 1504, and 1516. While these three components have been shown as separate entities, in some embodiments two or all three of the components may be formed as an integral unit.

The first component 1502 may have a prismatic profile with a first surface 1512 and a second surface 1514. Second surface 1514 may be conterminous with a first surface of the next component 1516. This particular component 1516 may be so configured as to be mechanically engaged with a drive mechanism or a neighboring LLSO. Second component 1516 may provide structural support to the first and third components 1502 and 1504 as well as having the appropriate functional configuration to rotate via its connection to an outer component 1506, which provides the rotational force, either by a gear, a belt, or by magnetic induction. This intermediate second component 1516 may have surface profiles that are planar. Though its two surfaces may be conterminous with the adjoining first surface 1518 of the third component 1504 and the other adjoining second surface 1514 of the first component 1502.

In some embodiments, the third component 1504, furthest from the source of light, may have a second surface 1520, which may have a profile that is planar, prismatic, or lenticular. For example, in FIG. 15, second surface 1520 of third component 1504 is depicted as an arcuate surface possessing optical power. Either or both of surfaces 1512 and 1520 may have optical coatings to reduce ghost images and/or to provide polarizing capability to the LLSO 1500.

Figure 16A:
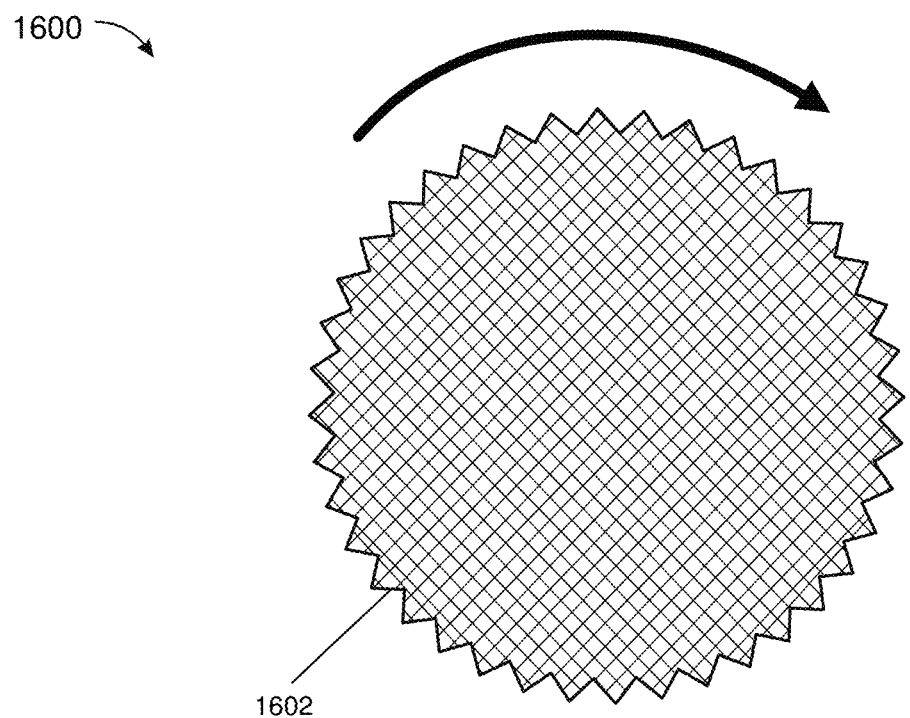
FIG. 16A is an axial view of an optical diffuser, in accordance with some embodiments.

In some embodiments that utilize a backlit subpixel array with one or more lasers providing the light which is directed by one or more MEMS arrays, an optical diffuser may be present downstream of each of the one or more lasers. In FIG. 16A, for example, a top (or bottom) view of an optical diffuser 1602 of an optical diffuser assembly 1600 is presented which has the property of decorrelating correlated light produced by a laser. The diffuser may have the optical properties of decorrelating the input laser light to achieve more uniform phase randomization and/or reduce any unwanted artifact that may have been generated upstream. In some embodiments the diffuser 1602 may rotate about a central axis in conjunction with the rotation of one or more LLSO as described herein. Additionally, or alternatively, the diffuser 1602 may rotate separately or may be stationary in a fixed location.

Figure 16B:
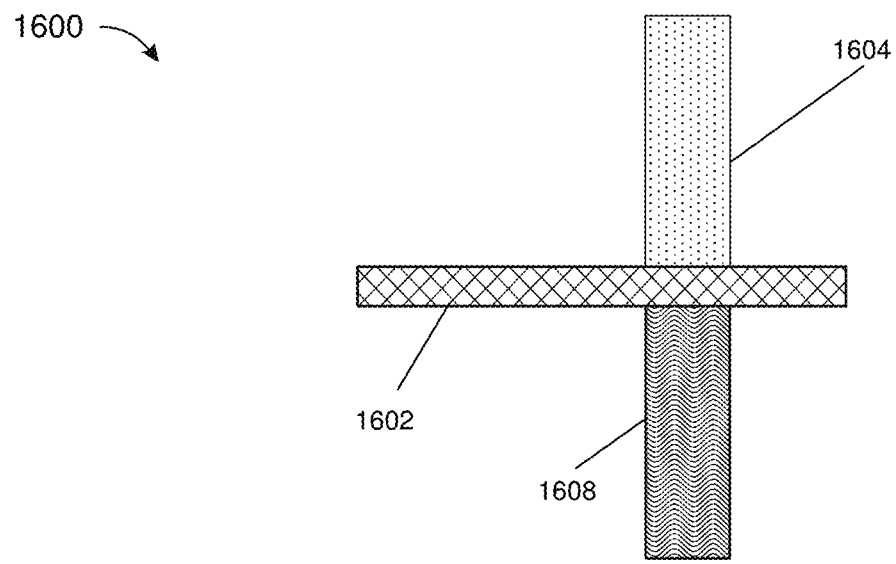
FIG. 16B is a cross-sectional side view of an optical diffuser, in accordance with some embodiments.

FIG. 16B shows a cross-sectional side view of the optical diffuser assembly 1600 of FIG. 16A with of a beam of correlated, or coherent, light 1608 (e.g., light from a laser emitter) passing through the diffuser 1602. The decorrelated light beam 1604 that emerges may possess little if any correlated light properties.

Figure 17A:
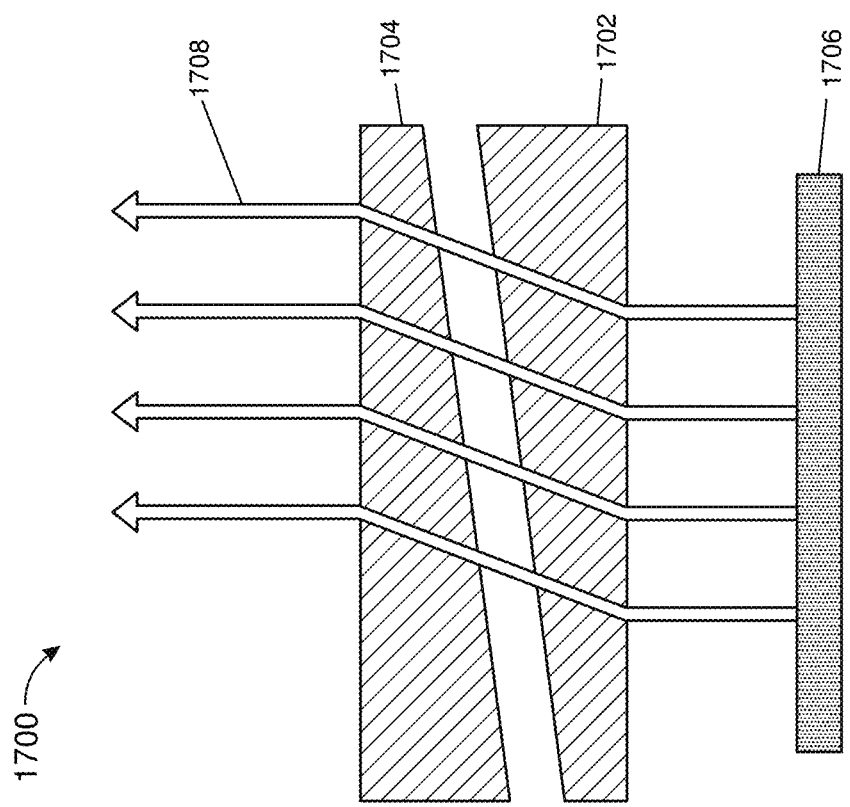
FIG. 17A is a cross-sectional side view of a configuration of two exemplary light deviators (LLSOs), in accordance with some embodiments.
Figure 17B:
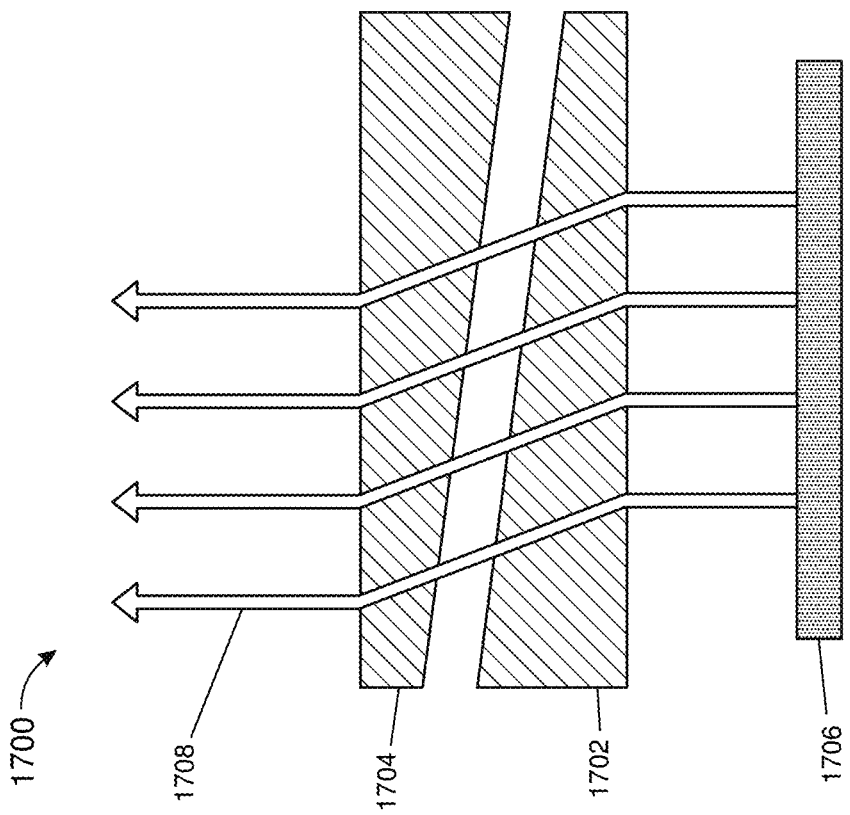
FIG. 17B is a cross-sectional side view of a configuration of two exemplary light deviators (LLSOs), in accordance with some embodiments.

While at least some of the afore-discussed embodiments refer to an LLSO or light deviator, in some embodiments, a plurality of light deviators/LLSOs may be configured in a consecutive arrangement disposed along an optical axis of (e.g., an optical axis of FIG. 3 indicated by the dot-dashed horizontal line). Such a plurality of axially-aligned LLSOs may co-rotate with each other or may rotate separately. A stack of LLSOs may be so arranged to direct light emitted from one or more of the subpixel arrays into appropriate directions. FIGS. 17A-B depict an assembly 1700 that includes two consecutively disposed LLSOs, including a first LLSO 1702 and a second LLSO 1704, disposed optically downstream of at least one subpixel array 1706 such that light 1708 from the subpixel array 1706 passes through the first and second LLSOs 1702 and 1704. The assembly 1700 of FIG. 17A may be rotated by 180° from that of the same assembly 1700 of FIG. 17B. This shows the lateral shifting ability of not only two LLSOs, but also of a single LLSO as well. In some embodiments, the first and second LLSOs 1702 and 1704 may co-rotate and may additionally be driven by the same drive mechanism. Alternatively, the first LLSO may be driven separately from the second LLSO.

The drive mechanism in any of the embodiments such as those depicted in FIGS. 6-17B, or in the descriptions associated therewith, may be engaged to any suitable motor, such as a stepper motor, a micro-stepping motor, or a DC brushless motor. Additionally, or alternatively, a magnetic system may induce rotation in the light deviator/LLSO. In some embodiments, one or more mechanical stops may be present in any of the examples depicted in FIGS. 6-17B, or modifications thereof, to constrain any off-diagonal components of a moment-of-inertia tensor of any of the rotating components.

Feedback systems may be disposed on a single rotating element, such as an light deviator/LLSO or a drive mechanism, or on the light deviator/LLSO tilt mechanism. Alternatively, feedback systems or indicators (such as a reflective strip) may be disposed on each of the rotating LLSOs and/or drive mechanism(s). In some embodiments, a feedback system may provide just a single zero-point location when coupled with the appropriate electronics to indicate when a given rotating element has reached a certain position. The feedback system may be relative or absolute. Such a feedback system may include a simple LED that engages a photodiode to establish a zero-point location on the LLSO. In these embodiments, a single location or point may be identified with each rotation. Not only does this establish the absolute position, but also the rotational speed as well, which may be required to accurately control positioning of the LLSO relative to the one or more subpixels disposed optically upstream therefrom that are operable to emit light. Alternatively, or additionally, a rotary encoder may be used, such as one that is engaged either with one or more of the rotating LLSOs or the drive mechanism itself. The feedback systems may provide information to a controller, such as the controller 320 shown in FIG. 3.

In some embodiments, a feedback system may be connected to a motor or driving spindle from the motor. When the motor is a micro-stepping motor, a rotatory encoder may be used. Alternatively, in some embodiments, counting micro-steps of a micro-stepping motor may satisfy the need for feedback information.

Alternatively, or additionally, the feedback system may measure more than a zero-point or reference location on either the drive mechanism or on one or more of the light deviators/LLSOs. The feedback system may measure angular displacement, or angular speed, which may be controlled by appropriately configured electronics. Precise rotational information of the drive mechanism or of one or more of the LLSOs may be provided by the feedback system to be able to control the precise timing or rotational speeds of a rotating component. The feedback system may report to a computing device or controller 320 of FIG. 3, or equivalent hardware, to provide accurate control over the positioning of one or more of the LLSOs.

An LLSO rotating above a subpixel array such as the one depicted in FIG. 4, as seen by a viewer, may create the impression to that viewer, if only one subpixel is illuminated during the rotational cycle of the rotating LLSO, then the image seen by the viewer of that single illuminated subpixel may be that of an illuminated circle. Reversing the afore-described relationship between a given illuminated physical subpixel and the virtual circle caused by the rotating LLSO may result in any subpixel illuminated on the circle necessarily resulting in a central subpixel being seen to be illuminated. Thus, by illuminating a given pixel at a certain time during the rotation of the LLSO, the pixel may be made to appear to be in a viewed location distinct from its actual physical location (i.e., its originating location). In some embodiments, such a configuration may also yield a distinct advantage, in that subpixels that may be dead or diminished in capacity may be optically overlaid by another subpixel judiciously chosen during the rotation of the LLSO, based upon the lateral shifting effect so described hereinabove.

The size and characteristics of the curve as seen by a viewer may be dependent primarily on optical properties of the light deviator/LLSO and on the space of allowable movements of the light deviator/LLSO. General optical properties may include the shape of the prismatic design (thickness, prismatic angle, refractivity, optical power, anamorphic, etc.). In the case of a regular prism, these optical properties may include the distance of the operably illuminated subpixel from the LLSO, the thickness of the LLSO, the apex angle of the LLSO, and the refractivity of the glass or substrate of the LLSO. As the refractivity of the LLSO is often dispersive, it follows that the thickness of the curves (width) produced for each of the different subpixel colors emitted from a given pixel, may vary slightly between disparate colors. However, given that even light from a subpixel seen by a viewer may not be resolvable with typical foveal resolution, the curves from differing colors may be seen to be essentially co-incident. In some examples, should the lateral shifts between colors be a problem (e.g., producing non-negligible color separation), a separate display per color may be tractable. In some examples, adjustments to distance, angle, and/or index of refraction of each LLSO of a plurality of LLSOs (each corresponding to a separate color display) may be made to negate the effects of dispersion and address the differences in the extent of lateral shifts.

In some embodiments, where the LLSO is a rotating regular prism, as depicted in FIG. 4, possessing no optical power, then a single illuminated subpixel may appear to a viewer to be a circular ring. If, however, that prism possesses optical power or is anamorphic, then the ring may be in the form of a non-circular curve, and in some embodiments, an ellipse.

The afore-described technique of making a given subpixel appear to be at a different location may be used to control what the viewer sees. Moreover, by illuminating a set of subpixels or pixels along the perceived circle during LLSO rotation, all the illuminated subpixels or pixels can appear to be at certain center location as seen by a viewer.

Figure 18:
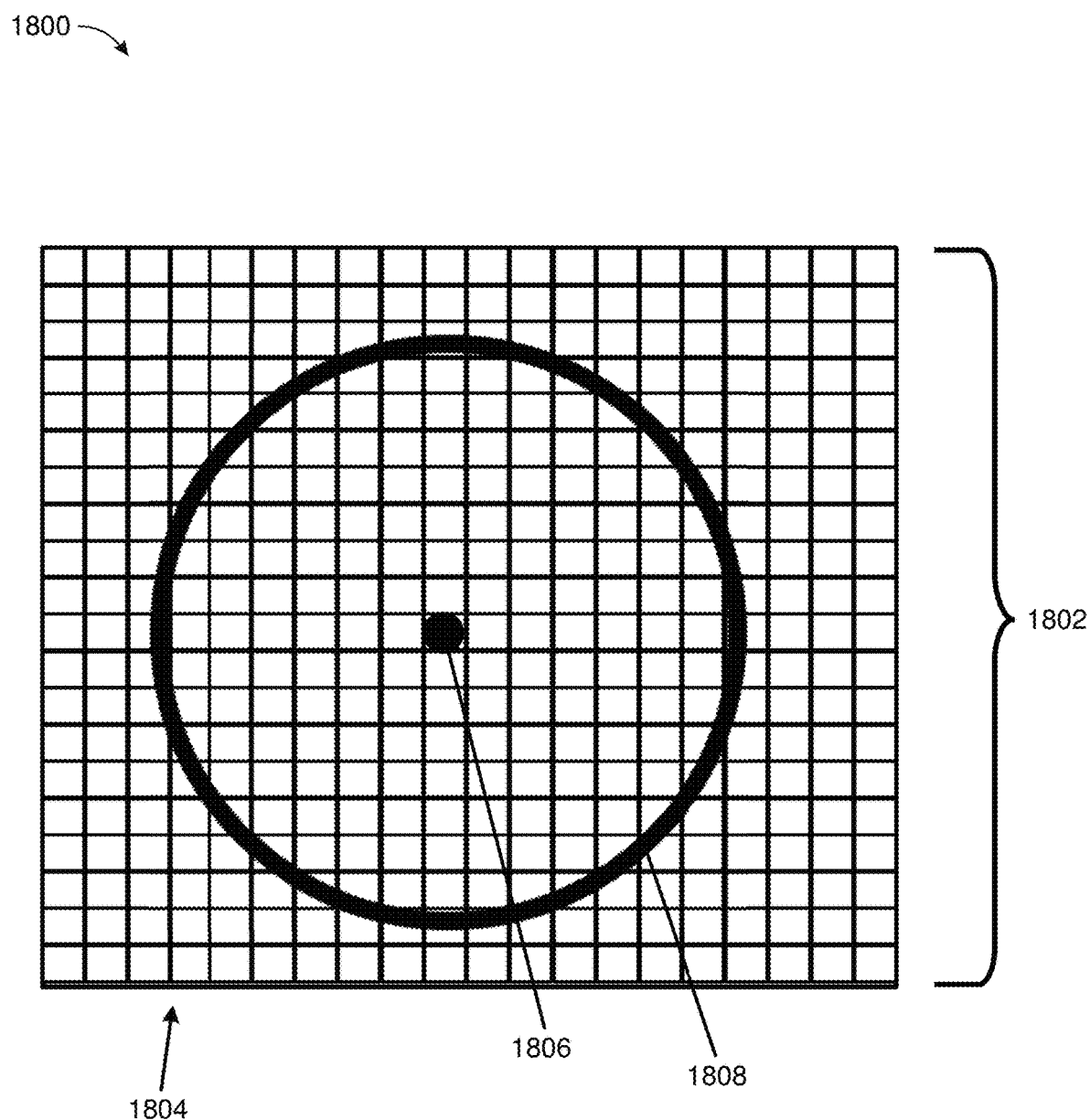
FIG. 18 is an aerial view of a schematic of an array of subpixels which demonstrates the effect of laterally shifting light from one subpixel to the apparent location of another subpixel, in accordance with some embodiments.

In some embodiments, a set of pixels may be illuminated during the rotation of the LLSO to create the perception of a pattern that is sensed by a viewer. Such a pattern may be that of an object, text, or appropriately modified images. FIG. 18 demonstrates a basic arrangement 1800 of subpixels in one part of the subpixel array mimicking pixels on another part of the subpixel array, due to the lateral translation of light of the LLSO extensively described hereinabove.

In FIG. 18, an array 1802 of subpixels 1804 may be optically upstream from a rotating LLSO which laterally shifts light emitted from an illuminated subpixel from its physical origin to an apparent location dictated by the design of the LLSO. In FIG. 18, if a particular subpixel 1806 is illuminated during the entire rotation of the optically downstream LLSO, and within the integration time of the eye of a viewer (<300 ms), then that viewer may see a circle or curve of light 1808 which emanates from only that one subpixel 1806. In this arrangement, the center of rotation of the LLSO coincides with the subpixel 1806.

Additionally, or alternatively, the described embodiments may be used in conjunction with temporally-multiplexed resolution enhancement and/or redundancy. For example, the same process of an image divided into multiple subframes may be used in any of the above-described techniques, and the subframe adjustments necessary for each technique may be mutually compatible. The subframes of an image may be projected to a viewer within the integration time of a typical human eye, and thus, the combination of the information contained in each subframe may appear to be associated with an image formed by the combination of subframes. The number of subframes may range, for example, from two to approximately 16 subframes.

Figure 19:
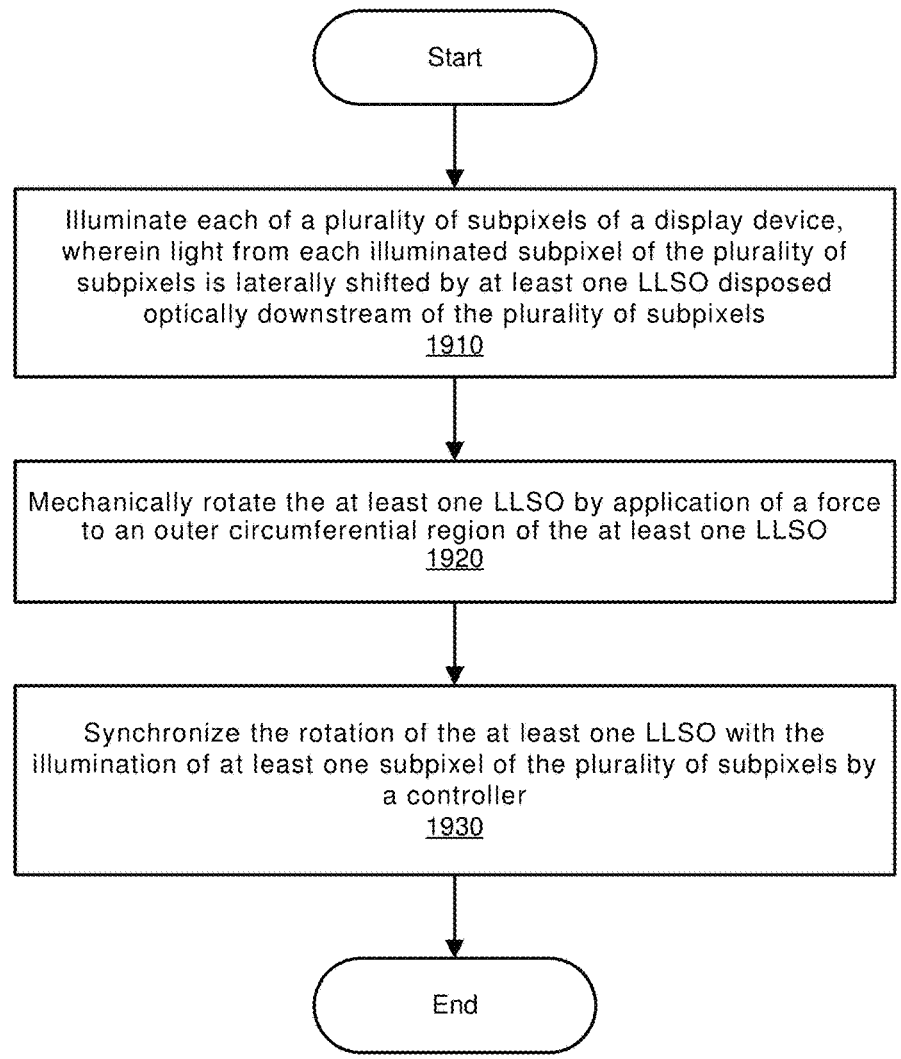
FIG. 19 is a flow diagram of an exemplary method for projecting light to a viewer, in accordance with some embodiments.

FIG. 19 is a flow diagram of an exemplary method 1900 for projecting light to a viewer. The steps shown in FIG. 19 may be performed by any suitable display device and/or system, including the devices and systems illustrated in FIGS. 1-18 and 20. In step 1910 of FIG. 19, each of a plurality of subpixels of a display device may be illuminated, wherein light from each illuminated subpixel may be laterally shifted by at least one LLSO disposed optically downstream of the plurality of subpixels, in accordance with one or more embodiments disclosed herein.

In step 1920 of FIG. 19, the at least one LLSO may be rotated by application of a force to an outer circumferential region of the at least one LLSO, in accordance with one or more embodiments disclosed herein.

In step 1930 of FIG. 19, the rotation of the at least one LLSO may be synchronized with the illumination of at least one subpixel of the plurality of subpixels by a controller in accordance with one or more embodiments disclosed herein. In some examples, method 1900 may further include focusing the laterally shifted light by an optical system to be viewed by a viewer.

Figure 20:
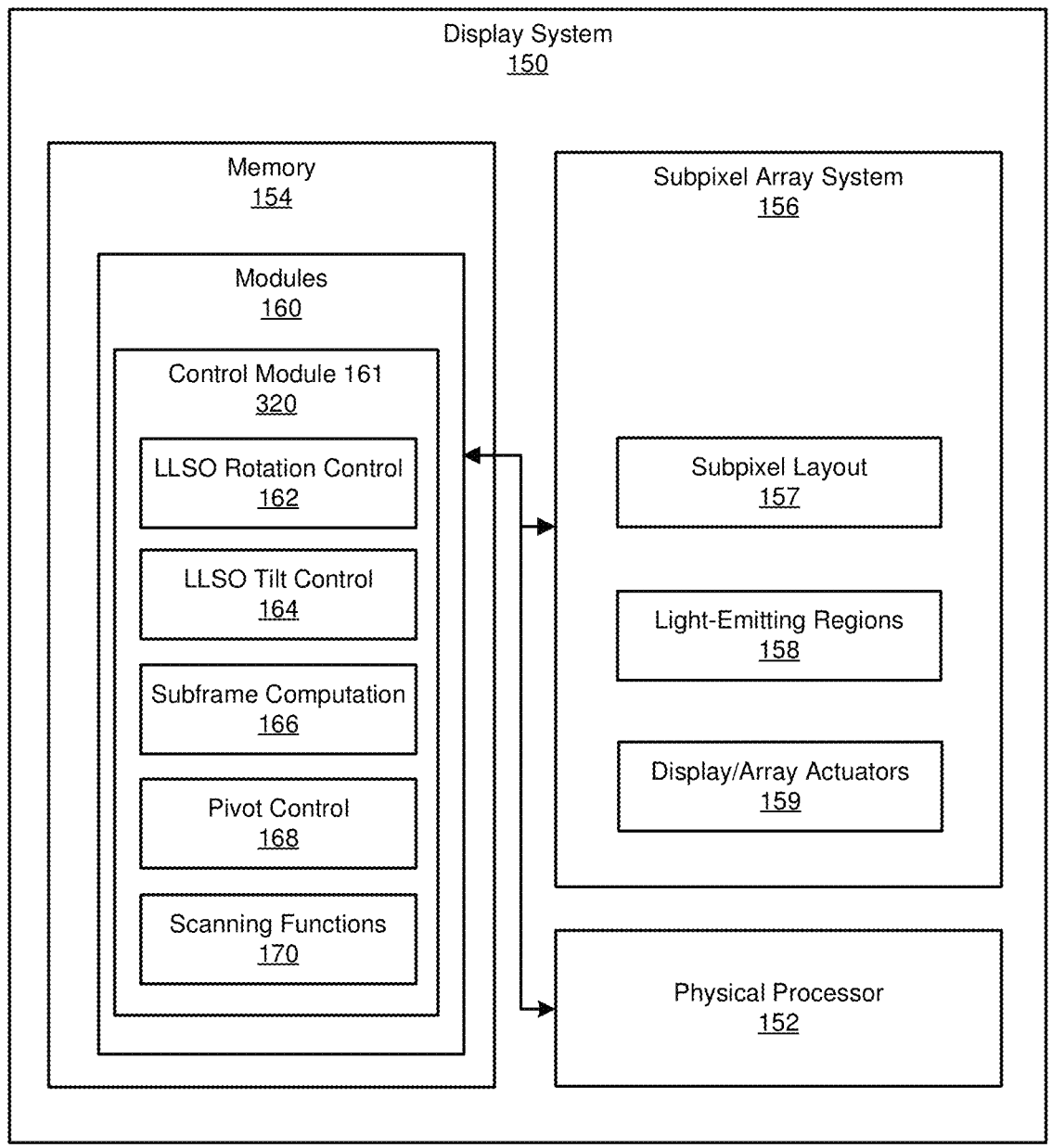
FIG. 20 is a block diagram of a system suitable for implementing the disclosed lateral light shifting, in accordance with some embodiments.

FIG. 20 is a block diagram of an example display system 150 including at least one physical processor 152, computer-readable media in the form of memory 154, and a subpixel array system 156. According to some embodiments, subpixel array system 156 may include a subpixel layout 157 (see, e.g., exemplary subpixel layouts as shown in FIGS. 5A-D), a color selector layer (not shown), a plurality of light-emitting regions 158 such as emissive subpixels, and one or more display and/or array actuators 159.

As illustrated in FIG. 20, display system 150 may also include one or more modules 160 for performing one or more tasks as disclosed herein, including actions performed by one or more of subpixel layout 157, light-emitting regions 158, display/array actuators 159, optical assembly 310, scanning assembly 315, and/or one or more controllers 320 (see FIG. 3) for various sub-systems, such as one or more rotating LLSOs. For example, display system 150 may include a control module 161 that provides, in at least one embodiment, LLSO rotation control 162, LLSO tilt control 164, subframe computations 166, pivot control 168, and/or scanning functions 170. Subframe computations 166 may be performed prior to any projection or display activity and may create instructions to other modules to perform their functions and/or actions at the designated time. With a multitude of predetermined subframes rapidly projected to a viewer, the impression derived by the viewer may be one possessing depth and/or action.

The described array devices, subpixel arrangements, and methods may allow for spatial, linear temporal, circular temporal, and/or any other suitable temporal subpixel averaging, enabling an increased range of pixel colors to be arrayed without sacrificing resolution or increasing the array area. Additionally, the disclosed devices, systems, and methods may enable array resolution to be enhanced using a movable LLSO that enables each subpixel location to function as a pixel emitting various colors that are averaged temporally. Thus, reference, in the present disclosure, to a pixel may include the components of that pixel, the various subpixels.

Each pixel may include subpixels that are operable to emit a white light when illuminated together. Alternatively, or additionally, at least one of the subpixels may emit light that appears to be white when viewed by a user. Each of a plurality of color subpixels of a pixel may further lie on a linear path such that a linear translation may allow each color subpixel of the pixel to appear in the same location at different times. Furthermore, each color of subpixel may lie on a circular path such that a circular translation may allow each color subpixel to appear in the same location. In some examples, a color selector layer may move while the light source remains stationary. By varying the locations of pixels and/or subpixels using LLSOs, as described herein, the disclosed methods, systems, and apparatuses may, for example, enable enhancement of image resolution, color, contrast, and/or other image characteristics. In some embodiments, varying the pixel and subpixel locations may allow for correction of and/or compensation for image defects, such as out-of-spec pixels, dead pixels, etc.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted array (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including"

and "having" (and their derivatives), as used in the specification and claims, are interchangeable with and have the same meaning as the word "comprising."

What is claimed is:

1. A display device for projecting light to a viewer comprising:
   a plurality of subpixels, each of the plurality of subpixels operable to emit light;
   at least one light deviator disposed optically downstream from the plurality of subpixels, wherein:
      light emitted from each of the plurality of subpixels is transmitted through and laterally shifted by the least one light deviator towards a viewer; and
      the at least one light deviator is mechanically rotatable by a force applied to an outer circumferential region of the at least one light deviator; and
   a controller that controls illumination of at least a subset of the plurality of subpixels in synchronization with rotation of the at least one light deviator.

2. The display device of claim 1, further comprising an optical system configured to focus the light from the at least one light deviator to the viewer.

3. The display device of claim 1, wherein:
   each of the at least one light deviator is disposed on a rotatable holder that is mechanically engaged with a drive mechanism; and
   the rotatable holder and each of the at least one light deviator is either configured separately or configured as an integral unit.

4. The display device of claim 3, wherein either the rotatable holder or the at least one light deviator is at least one capable of tilt or pivot.

5. The display device of claim 4, wherein the at least one light deviator has at least one of a prismatic, a lenticular, an anamorphic, or a planar profile, wherein the lenticular profile provides optical power to the at least one light deviator.

6. The display device of claim 1, wherein:
   the at least one light deviator comprises a plurality of light deviators so disposed as to be mechanically engaged with each other; and
   at least one of the plurality of light deviators is mechanically engaged with a drive mechanism by at least one of a belt or a gear.

7. The display device of claim 1, wherein a portion of the at least one light deviator having a cylindrical outer surface is rotationally supported in a support member having a cylindrical inner surface that abuts the cylindrical outer surface.

8. The display device of claim 1, wherein the controller is configured to shift the plurality of subpixels in a lateral dimension in synchronization with the rotation of the at least one light deviator and the illumination of the subset of the plurality of subpixels.

9. A method for projecting light to a viewer, the method comprising:
   illuminating each of a plurality of subpixels of a display device, wherein light from each illuminated subpixel of the plurality of subpixels is laterally shifted by at least one light deviator disposed optically downstream of the plurality of subpixels;
   mechanically rotating the at least one light deviator by application of a force to an outer circumferential region of the at least one light deviator; and
   synchronizing the rotation of the at least one light deviator with the illumination of at least one subpixel of the plurality of subpixels by a controller.

10. The method of claim 9, further comprising focusing the laterally shifted light by an optical system to be viewed by a viewer.

11. The method of claim 9, wherein each of the at least one light deviator is disposed on a rotatable holder that is mechanically engaged with a drive mechanism, wherein the rotatable holder and each of the at least one light deviator is either configured separately or configured as an integral unit.

12. The method of claim 11, wherein at least one of the rotatable holder or the at least one light deviator is configured to at least one of tilt or pivot.

13. The method of claim 12, wherein the at least one light deviator has at least one of a prismatic, an anamorphic, a lenticular, or a planar profile, wherein the lenticular profile provides optical power to the at least one light deviator.

14. The method of claim 9, wherein:
   the at least one light deviator comprises a plurality of light deviators so disposed as to be mechanically engaged with each other; and
   at least one of the plurality of light deviators is mechanically engaged with a drive mechanism by at least one of a belt or a gear.

15. The method of claim 9, wherein a portion of the at least one light deviator having a cylindrical outer surface is rotationally supported in a support member having a cylindrical inner surface that abuts the cylindrical outer surface.

16. A display device for projecting light to a viewer comprising:
   a plurality of subpixels, each of the plurality of subpixels operable to emit light;
   at least one light deviator disposed optically downstream from the plurality of subpixels, wherein:
      light emitted from each of the plurality of subpixels is transmitted through and laterally shifted by the least one light deviator towards a viewer; and
      the at least one light deviator has two surfaces, at least one of the two surfaces being optically coated to at least one of reduce ghost reflections, polarize the light emitted from each of the plurality of subpixels, or to analyze the light emitted from each of the plurality of subpixels; and
   a controller that controls illumination of at least a subset of the plurality of subpixels in synchronization with rotation of the at least one light deviator.

17. The display device of claim 16, wherein the at least one light deviator is mechanically engaged to at least one drive mechanism that provides at least one of rotational, tiltable, or pivotal motion.

18. The display device of claim 17, wherein rotational engagement between the at least one light deviator and the at least one drive mechanism is with at least one of a belt or a gear at a circumferential region of the at least one light deviator.

19. The display device of claim 16, wherein:
   a plurality of light deviators of the at least one light deviator is mutually mechanically engaged with each other; and
   a single light deviator of the plurality of light deviators is mechanically engaged with a drive mechanism.

20. The display device of claim 16, wherein a spindle is centrally disposed in each of the at least one light deviator and the spindle is mechanically engaged with a drive mechanism.

* * * * *